(12) United States Patent
Tsuneyoshi et al.

(10) Patent No.: US 7,344,100 B2
(45) Date of Patent: Mar. 18, 2008

(54) RECORDING AND/OR REPRODUCING DEVICE WHEREIN SHAFT IS OUT OF CONTACT WITH PULL-OUT ASSEMBLY ON ROTATING TAKE-UP REEL

(75) Inventors: Nobutaka Tsuneyoshi, Kanagawa (JP); Koji Kobayashi, Kanagawa (JP); Masaharu Kagami, Tokyo (JP); Hiromi Inoguchi, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 11/732,398

(22) Filed: Apr. 3, 2007

(65) Prior Publication Data

US 2007/0235576 A1 Oct. 11, 2007

(30) Foreign Application Priority Data

Apr. 5, 2006 (JP) ............................. 2006-103747

(51) Int. Cl.
*G11B 15/66* (2006.01)
(52) U.S. Cl. ............................. 242/332.4; 242/332.1; 360/95
(58) Field of Classification Search ................ 242/332, 242/332.4, 332.7, 332.8, 532.1, 532.6, 532.7, 242/582; 360/93, 95, 96.5, 99.02, 99.03
See application file for complete search history.

(56) References Cited

U.S. PATENT DOCUMENTS

| | | | |
|---|---|---|---|
| 4,334,656 A | | 6/1982 | Crawford et al. |
| 4,335,858 A | * | 6/1982 | Cranna ..................... 242/332.4 |
| 4,477,851 A | * | 10/1984 | Dalziel et al. ................. 360/95 |
| 4,742,407 A | * | 5/1988 | Smith et al. ............. 242/332.4 |
| 4,826,101 A | * | 5/1989 | Smith ....................... 242/332.4 |
| 4,852,825 A | * | 8/1989 | McGee et al. ........... 242/332.4 |
| 4,922,353 A | * | 5/1990 | Inoue ........................ 360/96.5 |
| 5,219,129 A | * | 6/1993 | Spicer et al. ............. 242/332.1 |
| 6,067,211 A | | 5/2000 | Chliwnyj et al. |
| 6,227,475 B1 | | 5/2001 | McAllister et al. |
| 6,378,796 B1 | * | 4/2002 | Hamming et al. ....... 242/332.4 |
| 2003/0168542 A1 | * | 9/2003 | Kurokawa et al. ....... 242/332.4 |
| 2004/0099757 A1 | * | 5/2004 | Masuda .................. 242/332.4 |

FOREIGN PATENT DOCUMENTS

| | | |
|---|---|---|
| JP | 11-328635 A | 11/1999 |
| WO | WO 00/30093 A1 | 5/2000 |

OTHER PUBLICATIONS

Related U.S. Appl. No. 11/732,399, filed Apr. 3, 2007; Inventors: Nobutaka Tsuneyoshi et al, Title: Recording and/or Reproducing Device Comprising an Automatic Shutter.

* cited by examiner

*Primary Examiner*—William A Rivera
(74) *Attorney, Agent, or Firm*—Frishauf, Holtz, Goodman & Chick, P.C.

(57) ABSTRACT

A driving mechanism, which drives a pull-out assembly up to an interior of a reel hub of a take-up reel, has a shaft which is inserted in a through hole bored in a grabber with a clearance. A shutter fixes the pull-out assembly in a receiving portion at a predetermined position on receiving the pull-out assembly in the receiving portion. A positioning member positions the shaft with a center of the shaft substantially coincided with a central axis of the take-up reel and with the clearance held between the shaft and an inner wall of the through hole when the pull-out assembly is received in the receiving portion.

17 Claims, 25 Drawing Sheets

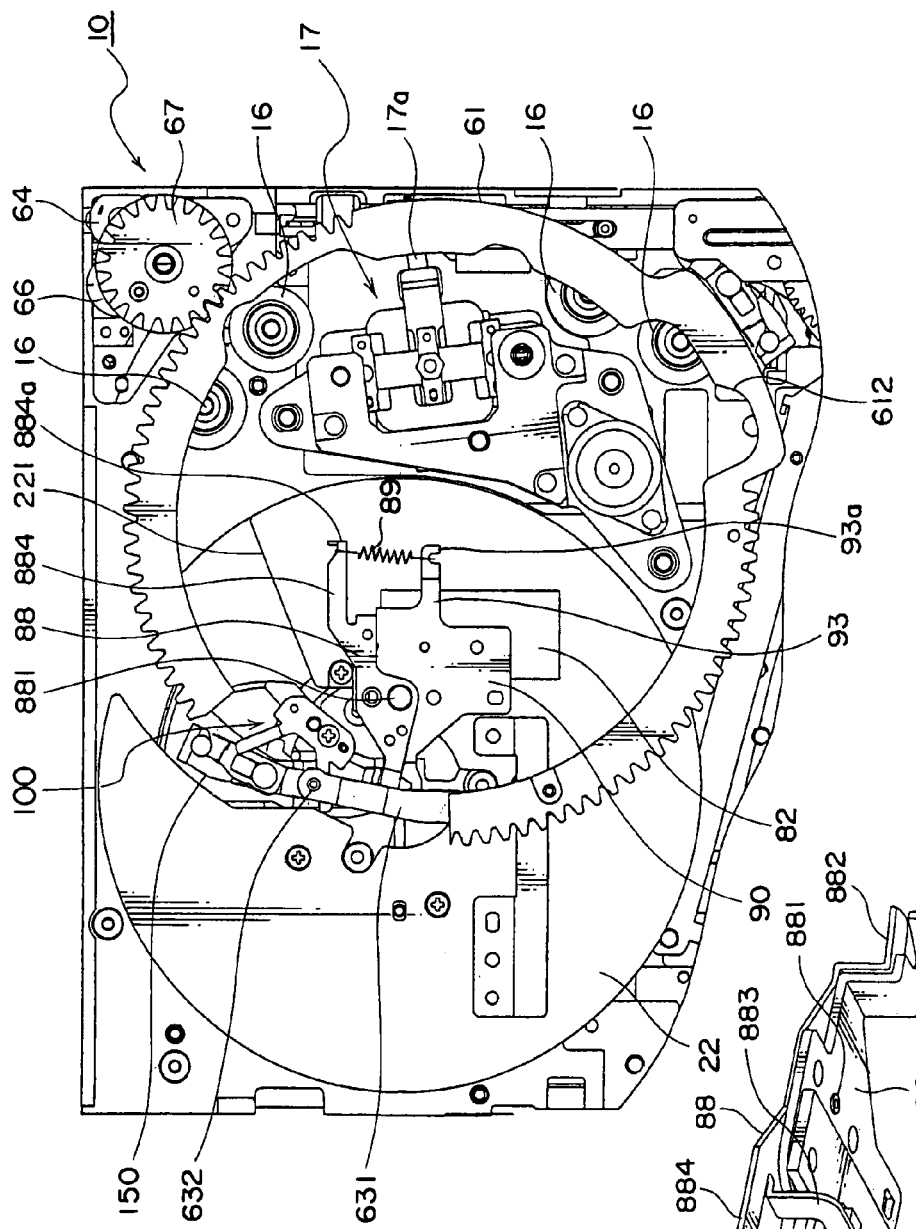
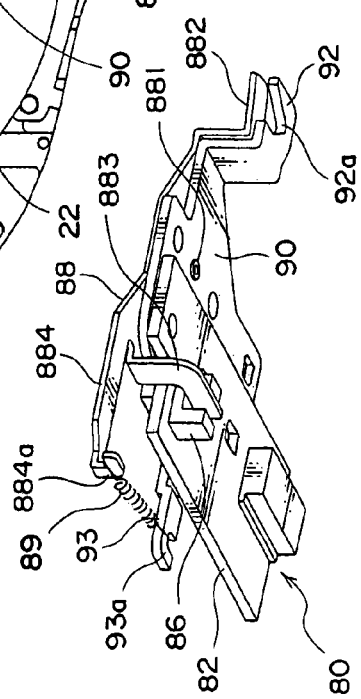
FIG. 7A
FIG. 7B

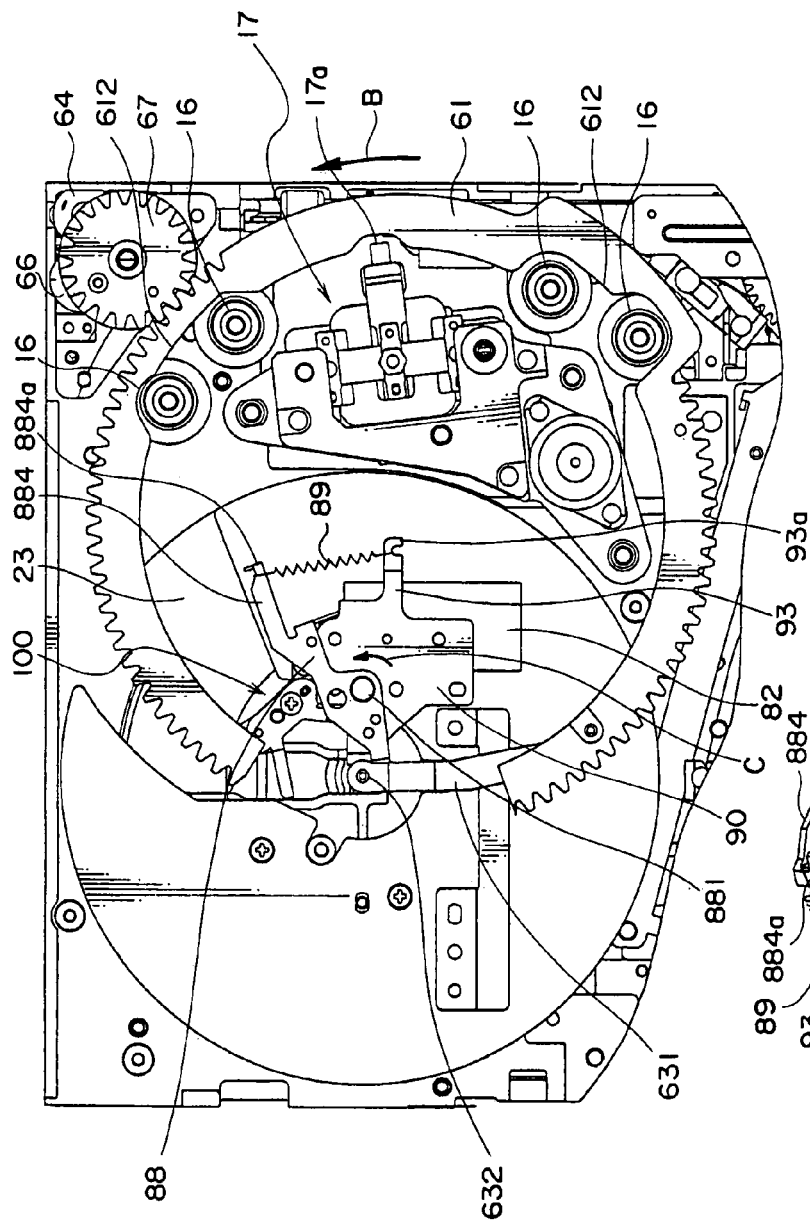
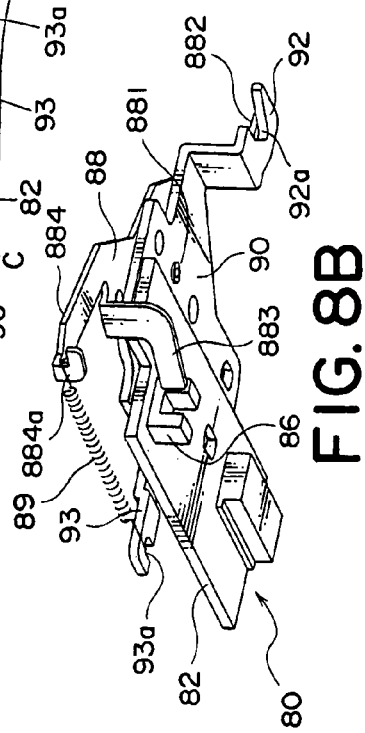
FIG. 8A
FIG. 8B

RECORDING AND/OR REPRODUCING DEVICE WHEREIN SHAFT IS OUT OF CONTACT WITH PULL-OUT ASSEMBLY ON ROTATING TAKE-UP REEL

This application claims priority to Japanese Patent Application JP 2006-103747, the disclosure of which is incorporated herein by reference.

BACKGROUND OF THE INVENTION

This invention relates to a recording and/or reproducing device represented by DLT (digital linear tape) or LTO (linear tape open) and, in particular, to a recording and/or reproducing device comprising a driving mechanism for driving a pull-out assembly so as to house it in a reel hub of a take-up reel.

Recording and/or reproducing devices of the type described are developed for use in back-up ones of computer systems and various types of the recording and/or reproducing devices have been proposed in prior art. Such a recording and/or reproducing device serving as the LTO is disclosed, for example, in the patent document WO 00/30093 A1.

The recording and/or reproducing device may be also a tape drive in which a cartridge having a single reel (a supply reel) can be installed. The cartridge may be also called a cassette. The recording and/or reproducing device contains a take-up reel therein. When the cartridge is installed in the recording and/or reproducing device, a magnetic tape is pulled out of the cartridge and then is wound by the take-up reel through a tape-transport path. The tape-transport path is for guiding the magnetic tape pulled out of the cartridge in a magnetic head. The magnetic head exchanges information between the tape and the magnetic head. In addition, the take-up reel is rotationally drivable by means of a real motor.

In the manner which is disclosed in the above-mentioned patent document WO 00/30093 A1, the cartridge comprises a housing, a rotationally drivable supply reel accommodated in the housing, the magnetic tape wound onto the reel hub of the supply reel, and a coupling element which is connected to the magnetic tape in the free end area of the magnetic tape and which is held in a coupling position. The coupling element is also called a leader pin.

In order to enable the magnetic tape contained in the cartridge to be wound onto the take-up reel, the magnetic tape should first be brought to the take-up reel with the aid of the leader pin. For this purpose, the recording and/or reproducing device has a pull-out element. The pull-out element is adopted to be coupled to the leader pin. The pull-out element is also called a grabber.

In order to enable the grabber to be coupled to the leader pin, the recording and/or reproducing device includes retaining means adapted to detachably retain the grabber. The retaining means are movably between a standby position and an operating position. A movement of the retaining means into their operating position causes a movement of the grabber in a coupling direction and the grabber and the leader pin to be coupled. On the other hand, a movement of the retaining means out of their operating position causes a movement of the grabber in a direction opposite to the coupling direction and the grabber and the leader pin to be disengaged.

In order to enable the grabber and the leader pin, after they have been coupled, i.e. a pull-out assembly thus formed, to be moved away from the retaining means an to be moved up to the reel hub of the take-up real, the recording and/or reproducing device includes actuating means. The actuating means are simply formed by a pull-out tape. The pull-out tape is guided along the above-mentioned tape-transport path. The pull-out tape is also called a leader tape.

In a conventional recording and/or reproducing device, the reader tape has one end connected to the grabber and its other end connected to a reel hub of the take-up reel. Thus, by driving the take-up reel in a take-up direction using a reel motor, the pull-out assembly can be moved away from the retaining means up to the reel hub of the take-up reel with the aid of the reader tape in a simple manner. The reel hub and the pull-out assembly are brought to each other. A combination of the take-up reel and the reel motor is called a tack-up mechanism.

In the manner which is described above, the patent document WO 00/30093 A1 discloses the recording and/or reproducing device (the tape drive) using the reader tape. In such a recording and/or reproducing device, the take-up reel comprises the reel hub, an upper reel flange which is integral with the reel hub, and a lower reel flange which is connected to the reel hub by means of an adhesive joint or by means of an ultrasonic weld. The pull-out assembly can be moved away from the retaining means to the real hub of the take-up reel by means of rotation of the pull-out tape (the leader tape) in a predetermined direction, in order to bring the reel hub and the pull-out assembly into engagement. In order to make this possible, the reel hub has a shape which differs from a circularly cylindrical shape in that a portion having the shape of circular segment is missing. When the reel hub of the take-up reel and the pull-out assembly have been brought into engagement, a partly cylindrical circumferential surface of the reel hub and a partly cylindrical circumferential surface of the pull-out assembly together from a cylindrical winding surface onto which the magnetic tape can be wound.

The recording and/or reproducing device disclosed in the patent document WO 00/30093 A1 comprises a radial direction positioning means between the reel hub of the take-up reel and the pull-out assembly. The radial direction positioning means comprises two projecting portions wherein a first projecting portion projects from the reel hub and a second projecting portion projects from the pull-out assembly.

In such a recording and/or reproducing device using the reader tape, in order to read/write data from/in the magnetic tape with stability, it is necessary to takes-up the magnetic tape on the take-up reel irrespective of the presence or absence of the leader tape. In the recording and/or reproducing device disclosed in the patent document WO 00/30093 A1, the leader tape is directly wound on the reel hub of the take-up reel.

Therefore, the recording and/or reproducing device disclosed in the patent document WO 00/30093 A1 has problems as follows. It will be assumed that the leader tape is thick and firm or the take-up reel has week winding force. Under the circumstances, it is disadvantageous in that there is uneven in winding because the magnetic tape is not wound along the reel hub of the take-up reel. Conversely, it will be assumed that the leader tape is thin. In this event, it is disadvantageous in that it is difficult to handle and durability is low.

On the other hand, a tape threading apparatus for use with a single reel cartridge of source tape is known, for example, in U.S. Pat. No. 6,227,475 issued to Jeffrey S. McAllister at al. The tape threading apparatus allows leader tape to be spooled onto in inner leader drum, and source tape to be spooled on to an outer take-up drum. The tape threading apparatus has a take-up reel having an outer drum configured to accept source tape. The tape threading apparatus further includes a leader drum which is supported essentially concentric with and at least partially rotatable with respect to the outer drum. The leader tape has a first end attached to the leader drum and a second end provided with a tape connector which can be connected to the source tape. The outer drum has a leader tape opening to allow leader tape to pass freely from the leader drum to the outside of the outer drum. The leader tape opening is configured to prevent passage of the tape connector therethrough. In a first embodiment, the leader drum is configured to be driven by a drive motor. Engagement of the tape connector into the tape opening causes the force imparted on the leader drum by a drive motor to be imparted to the outer drum, causing the outer drum to rotate and spool the source tape onto the outer drum. In a second embodiment, the tape threading apparatus further includes a spring having a first connection point connected to the leader drum and a second connection point connected to the take-up reel. Extension of the leader tape from the take-up reel causes compression of the spring such that when the source tape is connected to the tape connector and released, the spring causes the leader tape to be spooled onto the inner leader drum and the tape connector to be engaged into the opening in the outer drum. Thereafter, rotation of the outer drum will cause the source tape to be spooled onto the outer drum.

In the tape threading apparatus according to McAllister et al., the tape connector must substantially form a part of a cylindrical magnetic tape taking-up surface when the tape connector (a leader block) is received in the leader tape opening. Otherwise, a winding winkle of the magnetic tape may occur because the reel hub of the take-up reel has not cylindrical shape with precision. As a result, it is difficult to make the magnetic tape run at a constant speed. Accordingly, it is necessary to manufacture the tape connector (the leader block) and the leader tape opening with accuracy and it is necessary to position the tape connector in the leader tape opening with precision.

Other recording and/or reproducing devices using a pantocam arm or a threader arm in lieu of the leader tape are known, for example, in U.S. Pat. No. 6,067,211 issued to Alex Chliwnyj et al. or in Japanese Unexamined Patent Application Publication Tokkai No. H11-328635 or JP-A 11-328635.

According to Chliwnyj et al., the recording and/or reproducing device employs a pantocam arm which carries a leader pin for capturing a leader block, the leader block being attached to the magnetic tape to be processed. After capturing the leader block, the pantocam arm swings the leader block around an arcuate tape guide and then lodges the leader block in a take-up reel. When the take-up reel is rotated, the magnetic tape moves adjacent the magnetic head, the magnetic head being located intermediate the tape guide. After the magnetic tape is processed, a supply reel in the cartridge returns the magnetic tape to the cartridge and the pantocam arm delivers the leader block to the cartridge, where it is released.

In the recording and/or reproducing device using the threader arm disclosed in JP-A 11-328635, the threader arm comprises a driving arm which is rotatably driven by a driving portion such as a motor and a follower arm relatively rotatably coupled to the driving arm. The follower arm has a tip to which a threader pin is fixed. By driving the driving arm after the cartridge is inserted in the recording and/or reproducing device, the threader pin engaged with the leader block of the cartridge carries the leader block toward a machine reel (a take-up reel). On taking the cartridge out of the recording and/or reproducing device, the threader pin carries the leader block from the machine reel (the take-up reel) to the cartridge along a guide groove.

In either of those two recording and/or reproducing devices disclosed in U.S. Pat. No. 6,067,211 and JP-A 11-328635, one surface of the leader block forms a portion of the magnetic tape winding surface in the reel hub of the take-up reel when the leader block is received in the take-up reel (the machine reel).

That is, in the recording and/or reproducing devices using the pantocam arm or the threader arm, the reel hub of the take-up reel is provided with a reader block receiving slot which has a shape matching that of leader block (the pull-out assembly) (for example, see U.S. Pat. No. 4,334,656 issued to Roy P. Crawford et al.). The slot extends from the outer periphery of the reel hub radially inward past the axis of rotation a sufficient distance to position the axis of a coupling pin (the reader pin, the threader pin) coaxially with the axis of rotation of the take-up reel. With the coupling pin so positioned, the leader block is free to rotate relatively to the coupling pin as magnetic tape is wound on the take-up reel. In addition, an automatic tape threading apparatus disclosed in U.S. Pat. No. 4,334,656 comprises a driving mechanism (a driving system) for driving the leader block. The driving mechanism is for moving the coupling pin from a first position where it is selectively coupled and uncoupled from the leader block to a second position in the substantial center of the take-up reel. In the manner which is described above, the coupling pin is disposed substantially coaxial with the axis of rotation of the take-up reel so that rotation of the take-up reel, and hence, the leader block can occur without any adverse affect on the coupling pin.

In the recording and/or reproducing devices disclosed in U.S. Pat. No. 6,067,211 and JP-A 11-328635, as disclosed in U.S. Pat. No. 4,334,656, it is necessary to substantially position the axis of the coupling pin (the leader pin, the threader pin) coaxially with the axis of rotation of the take-up reel when the leader block (the pull-out assembly) is received in the reel hub of the take-up reel. That is, the coupling pin is used as a shaft of the take-up reel. However, U.S. Pat. No. 4,334,656 neither discloses a concrete structure or way how to substantially position the axis of the coupling pin (the shaft) coaxially with the axis of rotation of the take-up reel. That is, U.S. Pat. No. 4,334,656 does not disclose positioning means for the coupling pin (the shaft).

In addition, in order to rotate the take-up reel and the leader block (the pull-out assembly) without any adverse effect on the coupling pin (the shaft), it is necessary to make the axis (a center) of the coupling pin (the shaft) exact coincide with the axis (a center) of rotation of the take-up reel. However, the centers of both do not generally coincide with each other caused by unevenness of parts and/or assembly. Therefore, when the take-up reel rotates at a high speed, wearing occurs between the leader block (the pull-out assembly) and the coupling pin (the shaft), and then it is feared that a position relationship between the leader block (the pull-out assembly) and the coupling pin (the shaft) changes. Under the circumstances, it may have an adverse affect on the durability of the driving mechanism because the afore-mentioned driving mechanism is subjected to periodic motion through the coupling pin (the shaft).

In order to resolve this problem, those skilled in the art may consider a method of absorbing the above-mentioned unevenness of parts and/or assembly by setting clearance between the coupling pin (the shaft) and the leader block (the pull-out assembly). However, in motion under the condition, for example, of vibration, the coupling pin (the shaft) may move from a predetermined position due to the clearance of the driving mechanism and the coupling pin (the shaft) may be in contact with the leader block (the pull-out assembly). It is therefore not enough because collision and wearing occur between the coupling pin (the shaft) and the leader block (the pull-out assembly) when the take-up reel rotates at a high speed.

Accordingly, after the leader block (the pull-out assembly) is received in the reel hub of the take-up reel, a reliable method is required to prevent rotation of the take-up reel and the leader block (the pull-out assembly) from having any adverse affect so that the coupling pin (the shaft) is out of contact with the leader block (the pull-out assembly) on rotating the take-up reel.

SUMMARY OF THE INVENTION

It is therefore an object of the present invention to provide a recording and/or reproducing device wherein a shaft is not in contact with a pull-out assembly on rotating a take-up reel after the pull-out assembly is received in a reel hub of the take-up reel.

Other objects of this invention will become clear as the description proceeds.

On describing the gist of an aspect of this invention, it is possible to be understood that a recording and/or reproducing device, into which a cartridge can be loaded, comprises a take-up reel for taking up a magnetic tape accommodated in the cartridge. The cartridge accommodates the magnetic tape and a coupling element connected to an end portion of the magnetic tape. The recording and/or reproducing device has a pull-out element coupled to the coupling element to form a pull-out assembly when the cartridge is loaded in the recording and/or reproducing device. The recording and/or reproducing device comprises a driving mechanism for driving the pull-out assembly so as to move the pull-out assembly up into an interior of a reel hub of the take-up reel. The reel hub has an opening for passing the pull-out assembly through the interior thereof. The take-up reel has a receiving portion for receiving the pull-out assembly in the interior of the reel hub. According to the aspect of this invention, the driving mechanism has a shaft inserted in a through hole bored in the pull-out element with a clearance therebetween. The recording and/or reproducing device comprises a fixing arrangement for fixing the pull-out assembly in the receiving portion at a predetermined position on receiving the pull-out assembly in the receiving portion. A positioning member is for positioning the shaft with a center of the shaft substantially coincided with a central axis of the take-up reel and with the clearance held between the shaft and an inner wall of the through hole when the pull-out assembly is received in the receiving portion.

In the above-mentioned recording and/or reproducing device, the positioning member may comprise a positioning arm which extends to a center portion of the take-up reel in a radial direction and the positioning arm may have a catcher for catching the shaft at a tip thereof. In this event, the catcher preferably may has a uniquely positioning member for uniquely determining a position of the shaft. In addition, the uniquely positioning member desirably may consist of a V-shaped groove. The V-shaped groove preferably may have an angle between 60 degrees and 90 degrees, both inclusive.

In addition, the recording and/or reproducing device preferably further may comprise a crimping arrangement for crimping the shaft to the catcher. The driving mechanism may comprise a ring having a gear portion at an outer circumferential portion thereof, a ring arm having a first end coupled to the ring and a second end coupled to the shaft, and a motor coupled to the gear portion of the ring through a plurality of reduction gears. In this event, the crimping arrangement preferably may comprise a particular reduction gear in the plurality of reduction gears that is engaged with the gear portion of the ring. The particular reduction gear comprises a clutch member. The clutch member may comprise, for example, a rotation axis, a lower clutch gear, rotatably disposed around the rotation axis, for being engaged with one of the reduction gears, an upper clutch gear, rotatably disposed around the rotation axis, for being engaged with the gear portion of the ring, and a spring, disposed between the lower clutch gear and the upper clutch gear, for absorbing rotation of the lower clutch gear and the upper clutch gear.

The above-mentioned recording and/or reproducing device further may comprise a reception detector for detecting, in cooperation with the positioning member, whether or not the pull-out assembly is received in the receiving portion. The reception detector may comprise, for example, a sensor board fixedly mounted on the positioning member, a sensor mounted on the sensor board, and a sensor arm, rotatably mounted to the positioning member, for turning the sensor on or off. The sensor comprises, for example, a photo interrupter. The sensor arm may comprise a rotation axis mounted on the positioning member, an engaging arm extending from the rotation axis up to on the catcher to engage with the shaft, and a shielding arm extending from the rotation axis to control shielding/opening of the photo interrupter. The reception detector further may comprise an urging arrangement for urging the sensor arm in a direction where the shielding arm shields the photo interrupter. The positioning member may comprise an extending portion extending in the opposite direction to the positioning arm and the sensor arm may comprise an urging arm extending in the opposite direction to the engaging arm. In this event, the urging arrangement may comprise a tensile spring constructed between the urging arm and the extending portion.

In the above-mentioned recording and/or reproducing device, the take-up reel may have a stopper for stopping a head end of the pull-out assembly. In this event, the fixing arrangement may comprise a pressing arrangement for pressing the head end of the pull-out assembly to the stopper. In this event, the pressing arrangement may comprise, for example, a shutter mounted on the take-up reel. The shutter includes an open/close door for opening/closing the opening of the reel hub. In this event, the shutter preferably may include an urging arrangement which makes the open/close door contact with a rear end of the pull-out assembly on closing the open/close door to urge the head end of the pull-out assembly toward the stopper. The urging arrangement may comprise a torsion spring.

BRIEF DESCRIPTION OF THE DRAWINGS

FIG. 7A is a plan view showing the main portion of the tape drive (the recording and/or reproducing device) in a state just before the pull-out assembly is entered in the interior (the receiving portion) of the reel hub of the take-up reel;

FIG. 7B is a perspective view showing a state of the reception detector in the state illustrated in FIG. 7A;

FIG. 8A is a plan view showing the main portion of the tape drive (the recording and/or reproducing device) in a state where the pull-out assembly is entered in the interior (the receiving portion) of the reel hub of the take-up reel;

FIG. 8B is a perspective view showing a state of the reception detector in the state illustrated in FIG. 8A;

DESCRIPTION OF THE PREFERRED EMBODIMENT

Figure 1:
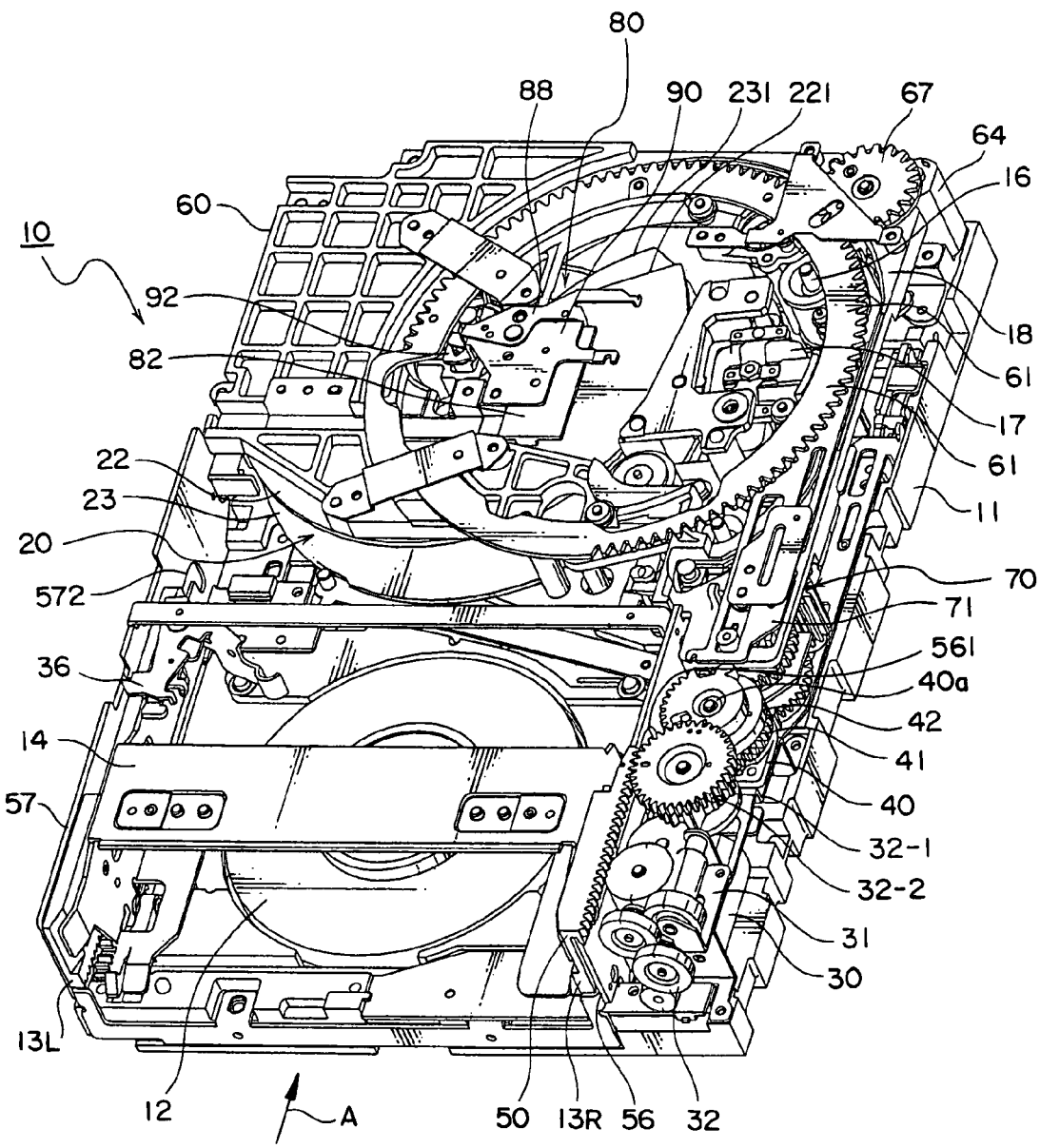
FIG. 1 is a perspective view showing a tape drive (a recording and/or reproducing device) to which this invention is applicable with an upper cover removed therefrom, seen from front upward.
Figure 2:
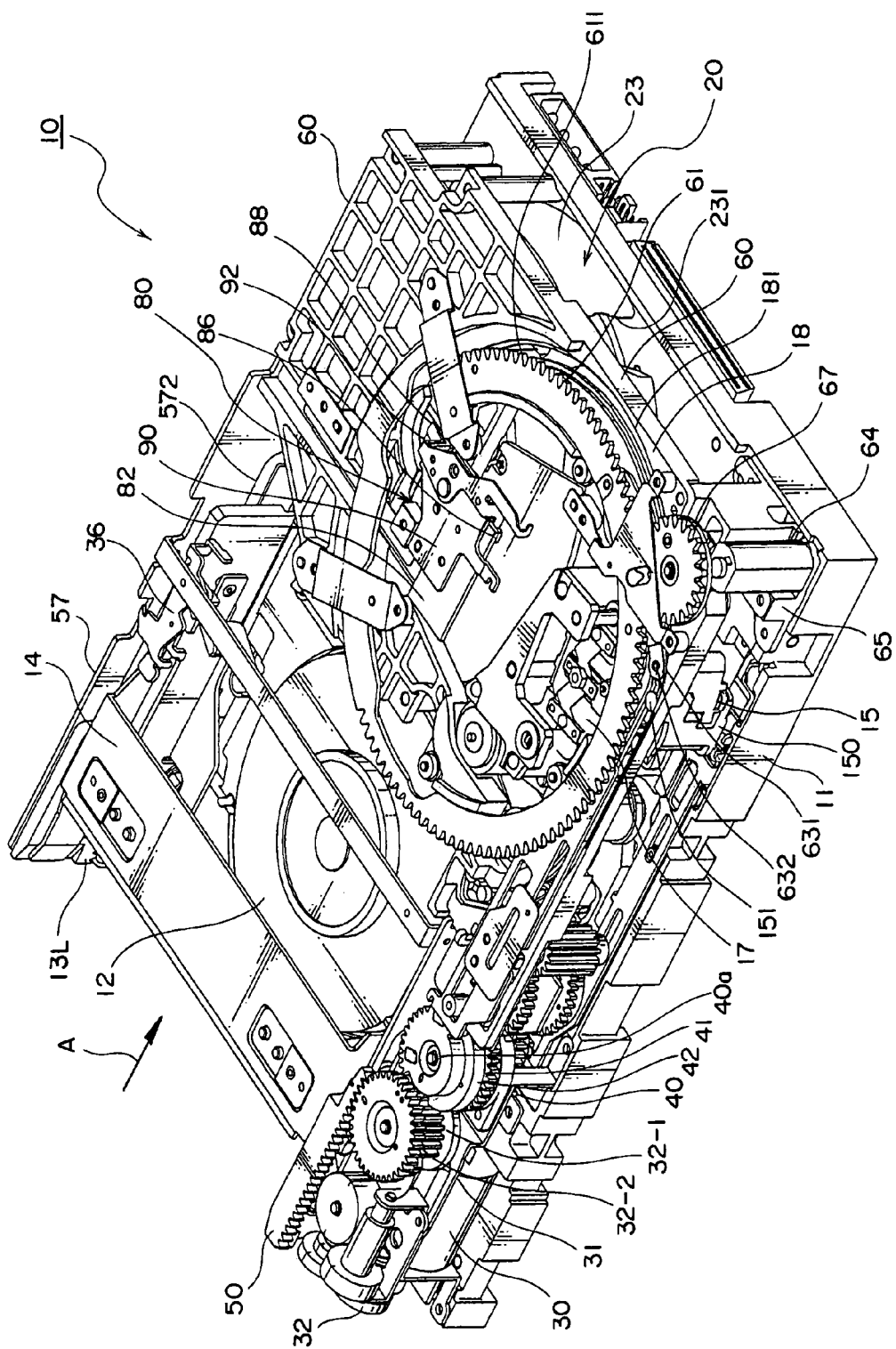
FIG. 2 is a perspective view showing the tape drive (the recording and/or reproducing device) illustrated in FIG. 1 with the upper cover removed therefrom, seen from right rear upward.
Figure 3:
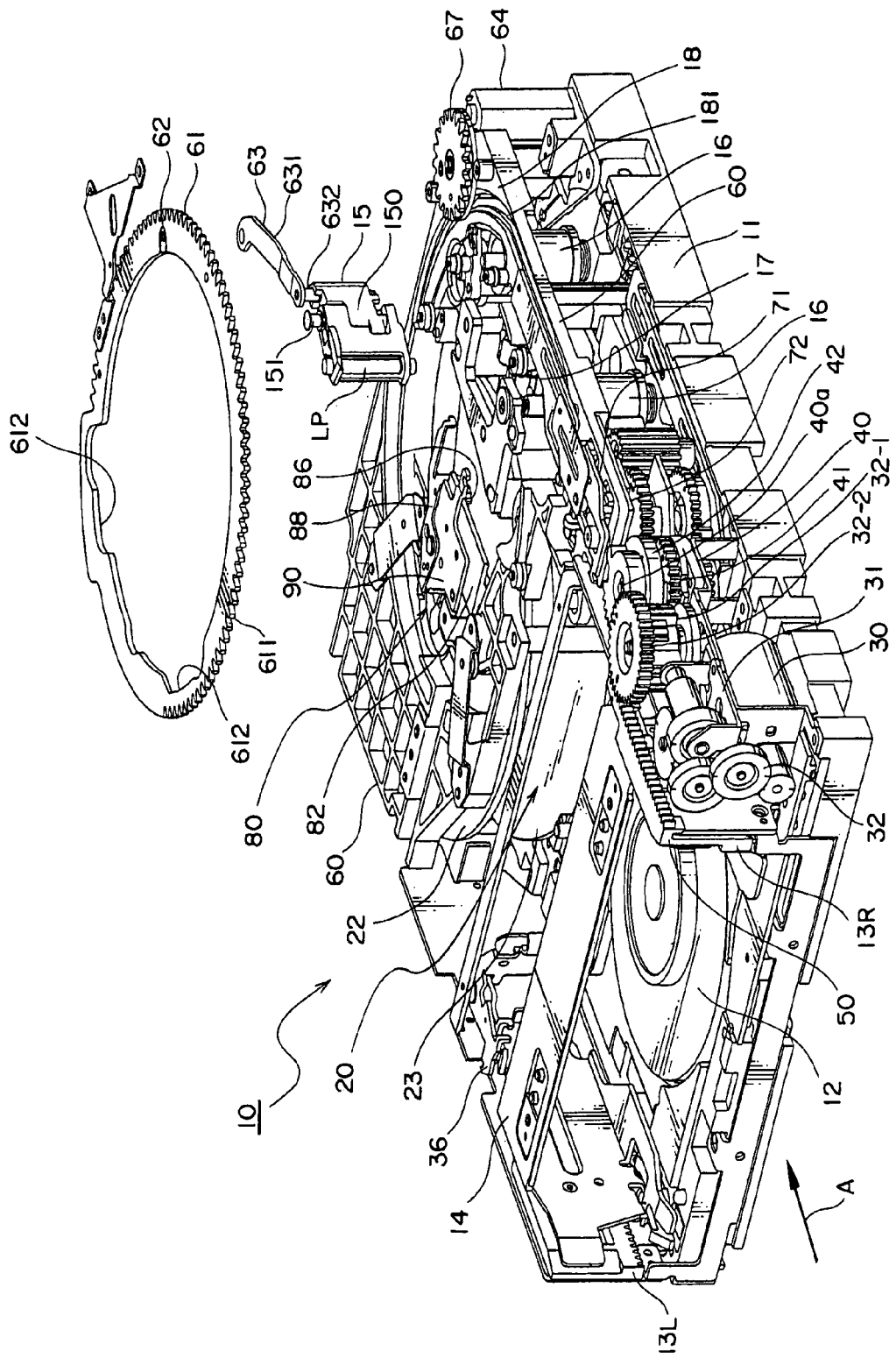
FIG. 3 is an exploded perspective view of the tape drive (the recording and/or reproducing device) illustrated in FIG. 1.

Referring to FIGS. 1 through 3, the description will proceed to a tape drive 10 serving as a recording and/or reproducing device to which this invention is applicable. FIG. 1 is a perspective view showing the tape drive 10 with an upper cover removed therefrom seen from on high and front. FIG. 2 is a perspective view of the tape drive 10 illustrated in FIG. 1 seen from on high and right-hand rear. FIG. 3 is an exploded perspective view of the tape drive 10 illustrated in FIG. 1.

The tape drive 10 is for receiving a cartridge (not shown) and contains a take-up reel 20 inside thereof. The take-up reel 21 is also called a spool. The tape drive 10 is generally comprised of a rectangular housing (chassis) 11 that has a common base. The base has a first spindle motor (reel motor) (not shown) and a second spindle motors (reel motors) 12. The first spindle motor has the spool (or the take-up reel) 20 permanently mounted on the base of the housing 11 and the spool 20 is dimensioned to accept a relatively high speed streaming magnetic tape (not shown). The second spindle motor (reel motor) 12 is adapted to accept the removable cartridge. The removable cartridge is inserted into the tape drive 10 via a right-hand slider cam 13R and a left-hand slider cam 13L which are formed on the housing 11 of the tape drive 10 along an insertion direction depicted at an arrow A. The right-hand slider cam 13R and the left-hand slider cam 13L are coupled to each other via a coupling gear (not shown). A combination (13R, 13L) of the right-hand slider cam 13R, the left-hand slider cam 13L, and the coupling gear is called a cam slider.

Upon insertion of the cartridge into the cam slider (13R<13L), the cartridge first is engaged with (held in) a cartridge holder 14, is automatically loaded in the tape drive 10, and then the cartridge engages with the second spindle motor (the supply reel motor) 12 in the manner which will later be described. Prior to rotation of the first and the second spindle motors (reel motors), the cartridge is connected to the permanently mounted spool (the take-up reel) 20 by means of a connection between a grabber (a pull-out element) 15 and a leader pin (a coupling element) LP (which will later be illustrated). Four rollers (guide rollers) 16 positioned intermediate the cartridge and the permanent spool 20 guide the magnetic tape as it traverses at relatively high speeds back and forth between the cartridge and the permanently mounted spool 20.

The tape drive 10 further comprises a head actuator 17 having a magnetic tape 17a (which will later be illustrated). The head actuator 17 is located between the take-up spool 20 and the cartridge on a tape-transport path (not shown) defined by the above-mentioned four rollers 16. During operation, the magnetic tape MT (which will later be illustrated) flows forward and backward between the take-up spool 20 and the cartridge and is closely adjacent to the magnetic head 17a of the head actuator 17 while the magnetic tape MT flows on the defined tape-transport path.

The tape drive 10 comprises a guide arrangement 18 for guiding a pull-out assembly 150 wherein the leader pin (the coupling element) LP is coupled to the grabber (a pull-out element) 15 between the take-up reel 20 and the cartridge.

The tape drive 10 has a switch (not shown) provided on a main surface of the chassis 11 at a front and right-hand side thereof. The switch is for detecting a position at which an automatic loading starts after the cartridge is inserted in the cam slider (13R, 13L). The switch is called a start switch. The start switch SW comprises a photo-interrupter. The right-hand slider cam 13R comprises a shielding plate (not shown) for shielding the start switch.

The tape drive 10 comprises a mode motor (a driving motor) 30 mounted on the main surface of the chassis 11. In the example being illustrated, the mode motor (the driving motor) 30 is installed forward of the chassis 11 at right-hand side thereof. The mode motor (the driving motor) 30 is covered by a motor bracket 31 fixed on the chassis 11. On the motor bracket 31, a plurality of reduction gears 32 is mounted. Those reduction gears 32 are rotated by driving force of the mode motor (the driving motor) 30. Among the plurality of reduction gears 32, two reduction gears 32-1 and 32-2 are rotatably mounted on the motor bracket 31 around the same rotation axis thereof. Hereinafter, the reduction gear 32-1 is called a first reduction gear while the reduction gear 32-2 is called a second reduction gear.

In addition, on the motor bracket (a fixing member) 31, a clutch member 40 is mounted. The clutch member 40 comprises first and second clutch gears 41 and 42 which are rotatably provided around the same rotation axis 40a thereof. The first clutch gear 41 is called a lower clutch gear because it is disposed at lower side. The second clutch gear 42 is called an upper clutch gear because it is disposed at upper side. The first clutch gear 41 engages with the first reduction gear 32-1 while the second clutch gear 42 engages with the second reduction gear 32-2. In addition, the second reduction gear 32-2 is engaged with a gear rack 50 which is fixedly mounted to the right-hand slider cam 13R.

That is, the first reduction gear 32-1 is for transmitting driving force of the driving motor 30 to the clutch member 40. In addition, the second reduction gear 32-2 is for transmitting transmission force of the clutch member 40 to the cam slider (13R, 13L). At any rate, a combination of the reduction gears 32, the clutch member 40, and the gear rack 50 serves as a transmission mechanism for transmitting the driving force of the mode motor (the driving motor) 30 to the cam slider (13R, 13L).

Referring now to FIGS. 1 and 2, the description will proceed to a guide arrangement for guiding the cam slider (13R, 13L) and the cartridge holder 14.

The tape drive 10 comprises, as the guide arrangement, a first guide wall 56 and a second guide wall 57 both of which extend in the insertion direction A. The first guide wall 56 is called a right-hand guide wall because it is disposed in a right hand with respect to the insertion direction A. The second guide wall 57 is called a left-hand guide wall because it is disposed in a left hand with respect to the insertion direction A.

The first guide wall (the right-hand guide wall) 56 has a first guide channel slot 561 for guiding the right-hand slider cam 13R and the cartridge holder 14. The first guide channel slot 561 has an L-shape which extends along the insertion direction A and extends in a direction perpendicular to the insertion direction A toward the chassis 11. In the first guide channel slot 561, first and second guide pins (not shown) are engaged. The first guide pin laterally projects from the right-hand slider cam 13R while the second guide pin laterally projects from a right-hand wall of the cartridge holder 14.

The second guide wall (the left-hand guide wall) 57 has a pair of second guide channel slots 572 for guiding the left-hand slider cam 13L and the cartridge holder 14. Each of the pair of second guide channel slots 572 has an L-shape which extends along the insertion direction A and extends in a direction perpendicular to the insertion direction A toward the chassis 11. In the pair of second guide channel slots 572, a pair of third guide pins (not shown) and a pair of fourth guide pins (not shown) are engaged. The pair of third guide pins laterally projects from the left-hand slider cam 13L while the pair of fourth guide pins laterally projects from a left-hand wall of the cartridge holder 14.

As shown in FIGS. 1 through 3, the tape drive 10 comprises a cartridge holder locking mechanism 36 for locking the cartridge holder 14 (the cam slider (13R, 13L)). The cartridge holder locking mechanism 36 is for preventing the cam slider (13R, 13L) from moving in the insertion direction A when the cartridge is not correctly inserted in the cartridge holder 14. Accordingly, when the cartridge is correctly inserted in the cartridge holder 14, a lock of the cartridge holder 14 by the cartridge holder locking mechanism 36 is released and it results in allowing the cartridge holder 14 to move in the insertion direction A.

In the manner which is described above, the cam slider (13R, 13L), which makes the cartridge holder 14 holding the cartridge move, is coupled to the mode motor (the driving motor) 30 via the above-mentioned transmission mechanism.

The cartridge is perfectly inserted in the cam slider (13R, 13L), the cartridge is held in the cartridge holder 14. In addition, the cam slider (13R, 13L) is only movable along the insertion direction A by the above-mentioned guide arrangement. The cartridge holder 14 is movable along the L-shaped pass by means of the guide arrangement.

With this structure, when the cartridge is manually inserted in the cam slider (13R, 13L), the lock of the cartridge holder 14 by the cartridge holder locking mechanism 36 is released and the cam slider (13R, 13L) moves in the insertion direction A. Inasmuch as the gear rack 50 is fixedly mounted on the right-hand slider cam 13R, the second reduction gear 32-2 engaged with the gear rack 50 rotates around the rotation axis thereof in a clockwise direction. Therefore, the upper clutch gear 42 of the clutch member 40 rotates around the rotation axis thereof in a counterclockwise direction. However, inasmuch as the clutch member 40 has a play, the lower clutch gear 41 does not rotate. This operation is a manual load operation. However, in a case where the tape drive 10 is mounted in an autoloader/library system, it is noted that an insertion of the cartridge in the cam slider (13R, 13L) is automatically carried out by the autoloader/library system.

On the other hand, the cam slider (13R, 13L) and the mode motor (the driving motor) 30 are coupled to each other via the above-mentioned transmission mechanism. Accordingly, if the mode motor (the driving motor) 30 rotates in a predetermined direction, the cam slider (13R, 13L) moves in the insertion direction A via the transmission mechanism. In this event, engaged with (held in) the cartridge holder 14, the cartridge also moves in the insertion direction A. This operation is an automatic load operation.

A switching between the manual load operation and the automatic load operation is carried out by turning on/off of the above-mentioned start switch.

Referring now to FIGS. 1 through 3, the description will be made about an operation in a case of loading the cartridge.

In the manner which is described above, the cartridge holder 14 (the cam slider (13R, 13L)) is locked (or fixed) by the cartridge holder locking mechanism 36 until the cartridge is inserted therein.

In this state, it will be assumed that the cartridge is manually inserted in the cam slider (13R, 13L) along the insertion direction A. Thereby, the above-mentioned lock of the cartridge holder 14 (the cam slider (13R, 13L)) by the cartridge holder locking mechanism 36 is released and the cam slider (13R, 13L) is movable along in the insertion direction A. In this event, the cartridge holder locking mechanism 36 rotates around the rotation axis thereof in a clockwise direction.

When the cartridge is perfectly inserted in the cam slider (13R, 13L), the cartridge is held in the cartridge holder 14.

In this state, it will be assumed that the cartridge is further manually pushed in the insertion direction A. Thereby, the cam slider (13R, 13L) is pushed in the insertion direction A. As a result, engaged with the gear rack 50 fixed to cha cam slider (13R, 13L), the second reduction gear 32-2 rotates around the rotation axis thereof in the clockwise direction. Thereby, engaged with the second reduction gear 32-2, the upper clutch gear 42 of the clutch member 40 rotates around the rotation axis thereof in the counterclockwise direction. Inasmuch as the clutch member 40 has the play in the manner which is described above, the lower clutch gear 41 does not rotate even if the upper clutch gear 42 rotates.

When the cartridge is furthermore manually pushed in the insertion direction A by a small amount, the above-mentioned start switch is turned on at a predetermined position and an automatic load switching signal is sent to a control circuit (not shown). Responsive to the automatic load switching signal, the control circuit drives the mode motor (the driving motor) 30 to rotatably drive the first reduction gear 32-1 around the rotation axis thereof in the clockwise direction. Thereby, engaged with the first reduction gear 32-1, the lower clutch gear 41 of the clutch member 40 rotates around the rotation axis thereof in the counterclockwise direction. Thereby, the upper clutch gear 42 also rotates around the rotation axis thereof in the counterclockwise direction with the play of the clutch member 40. Engaged with the upper clutch gear 42, the second reduction gear 32-2 rotates around the rotation axis thereof in the clockwise direction. Therefore, inasmuch as the gear rack 50 engaged with the second reduction gear 32-2, the cam slider (13R, 13L) also moves along the insertion direction A. As a result, held in the cartridge holder 14, the cartridge also moves along the insertion direction A. In the manner which is described above, the automatic load operation of the cartridge is carried out.

Referring to FIGS. 2 and 3, in the manner which is described above, the pull-out assembly 150 wherein the leader pin (the coupling element) LP is coupled to the grabber (the pull-out element) 15 is guided along the guide arrangement 18 between the take-up reel 20 and the cartridge.

The guide arrangement 18 comprises a guide channel slot 181 formed in a base 60. The base 60 and the chassis 11 are spaced apart in the width direction of the magnetic tape MT (which will later be illustrated) by a distance larger than the width of the magnetic tape MT. With the guide channel slot 181, a guide pin 151 projecting upward from the grabber 15 (the pull-out assembly 150) engages.

At any rate, the pull-out assembly 150 wherein the leader pin (the coupling element) LP is coupled to the grabber (the pull-out element) 15 moves along the guide arrangement 18, and is received and fixed in the interior of the reel hub 21 (which will later be described) of the take-up reel 20 at a predetermined position in the manner which will later be described.

The take-up reel 20 comprises a cylindrical reel hub 21 (which will later be illustrated). The reel hub 21 has an outer circumferential surface which is used as a cylindrical winding surface onto which the magnetic tape MT can be wound.

The reel hub 21 has an upper end to which an upper reel flange 22 is mounted and a lower end to which a lower reel flange 23 is mounted. The upper reel flange 22 and the lower reel flange 23 have an upper guide channel slot 221 (which will later be illustrated) and a lower guide channel slot 231 (which will later be illustrated), which are for receiving the pull-out assembly 150, formed thereto in a slanting direction, respectively. In addition, the reel hub 21 has an opening 21a (which will later be illustrated) for passing the pull-out assembly 150 therewithin. Furthermore, the take-up reel 20 comprises a stopper 24 for stopping a header end 152 of the pull-out assembly 150.

A combination of the upper guide channel slot 221, the lower guide channel slot 231, the opening 21a, and the stopper 24 serves as a reception portion (a slot) for receiving the pull-out assembly 150 in the interior of the reel hub 21.

At any rate, the slot (the reception portion) extends from the outer circumferential surface of the reel hub 21 in a inner radial direction and extends through the axis of rotation by a sufficient distance where an axis of a grabber shaft (which will later be described) is concentric with the axis of rotation of the take-up reel 20.

Figure 4:
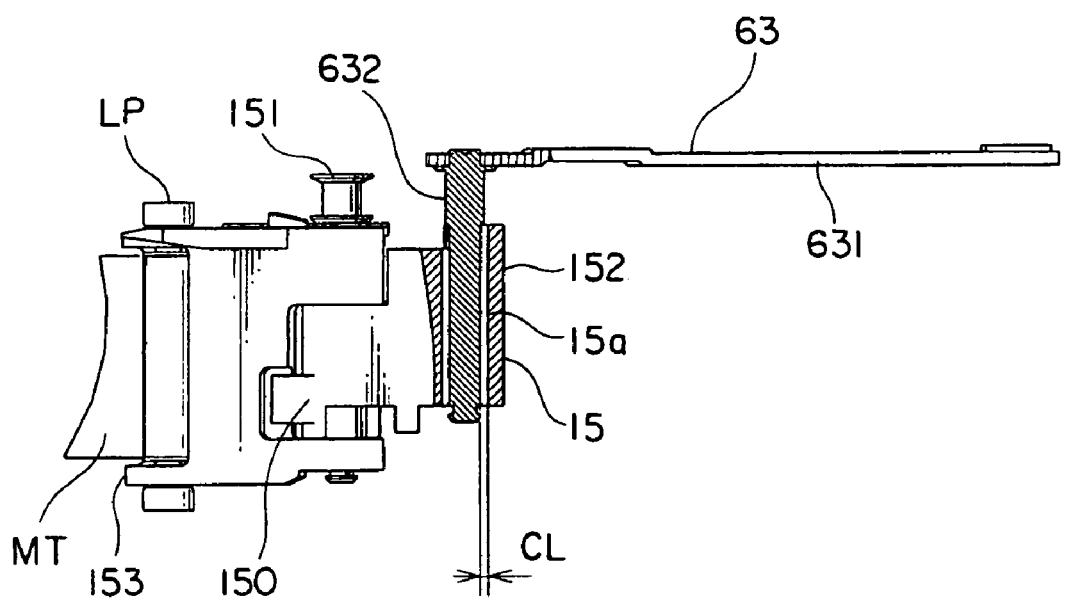
FIG. 4 is a partial cross front view of a main part of an operating arrangement (a driving mechanism) used in the tape drive (the recording and/or reproducing device) together with a pull-out assembly.

Referring to FIG. 4 in addition to FIGS. 1 through 4, the description will proceed to the driving mechanism for moving the pull-out assembly 150 from the cartridge up to the reel hub 21 of the take-up reel 20.

The driving mechanism comprises a ring 61 which is rotatably mounted on an upper surface of the base 60 around a center axis thereof. The ring 61 has a gear portion 611 at an outer circumferential edge thereof. To the ring 61, a ring shaft 62 projecting downward is mounted at a predetermined position. The ring shaft 62 and the grabber 15 (the pull-out assembly 150) are coupled to each other by a coupling member 63.

The coupling member 63 comprises a grabber arm (a ring arm) 631 and the grabber shaft depicted at 632. The grabber arm (the ring arm) 631 extends in a plane (in a horizontal direction) in parallel with a plane in which the ring 61 extends. The grabber shaft 632 extends in a direction (a vertical direction) perpendicular to the plane in which the ring 61 extends. The grabber arm (the ring arm) 631 has a first end coupled to the ring shaft 62 and a second end coupled to the grabber shaft 631. That is, the grabber arm (the ring arm) 631 is rotatably mounted to the ring shaft 62.

On the other hand, as shown in FIG. 4, the grabber shaft 632 is freely inserted in a through hole 15a bored in the grabber 15. Between the grabber shaft 632 and an inner wall of the through hole 15a of the grabber 15, there is a sufficient clearance CL, as shown in FIG. 4.

According, it is possible to move the pull-out assembly 150 along the guide arrangement 18 by rotating the ring 61.

In order to rotate the ring 61, between the base 60 and the chassis 11, a DC motor 64 is provided. The DC motor 64 is mounted on the chassis 11 by means of a motor bracket 65. Rotation force of the DC motor 64 is transmitted to the ring 61 through a plurality of reduction gears 66 and a clutch member 67. In addition, the clutch member 67 comprises a reduction gear. The clutch member 67 is rotatably mounted on the upper surface of the base 60 and is engaged with the gear portion 611 of the ring 61.

In addition, on the base 60, a grabber state detector 70 is mounted. The grabber state detector 70 is for detecting whether the grabber (the pull-out element) 15 is put into a standby state or an operation state. The grabber state detector 70 comprises a sensor plate 71 and a sensor board 72. The sensor plate 71 extends on the upper surface of the base 60 in the insertion direction A and is slidably mounted along the insertion direction A. The sensor board 72 is opposed to the sensor plate 71 with the base 60 sandwiched therebetween. The sensor plate 71 is always urged in the insertion direction A by means of a spring (not shown).

The sensor board 71 mounts first and second sensors (not shown) thereon. Each of the first and the second sensors comprises a photo-interrupter. The sensor plate 71 comprises a sensor plate shielding plate (not shown) for shielding the first and the second sensors.

The first sensor is for detecting that the grabber 15 is put into the standby state. The second sensor is for detecting that the grabber 15 is put into the operation state.

Figure 5:
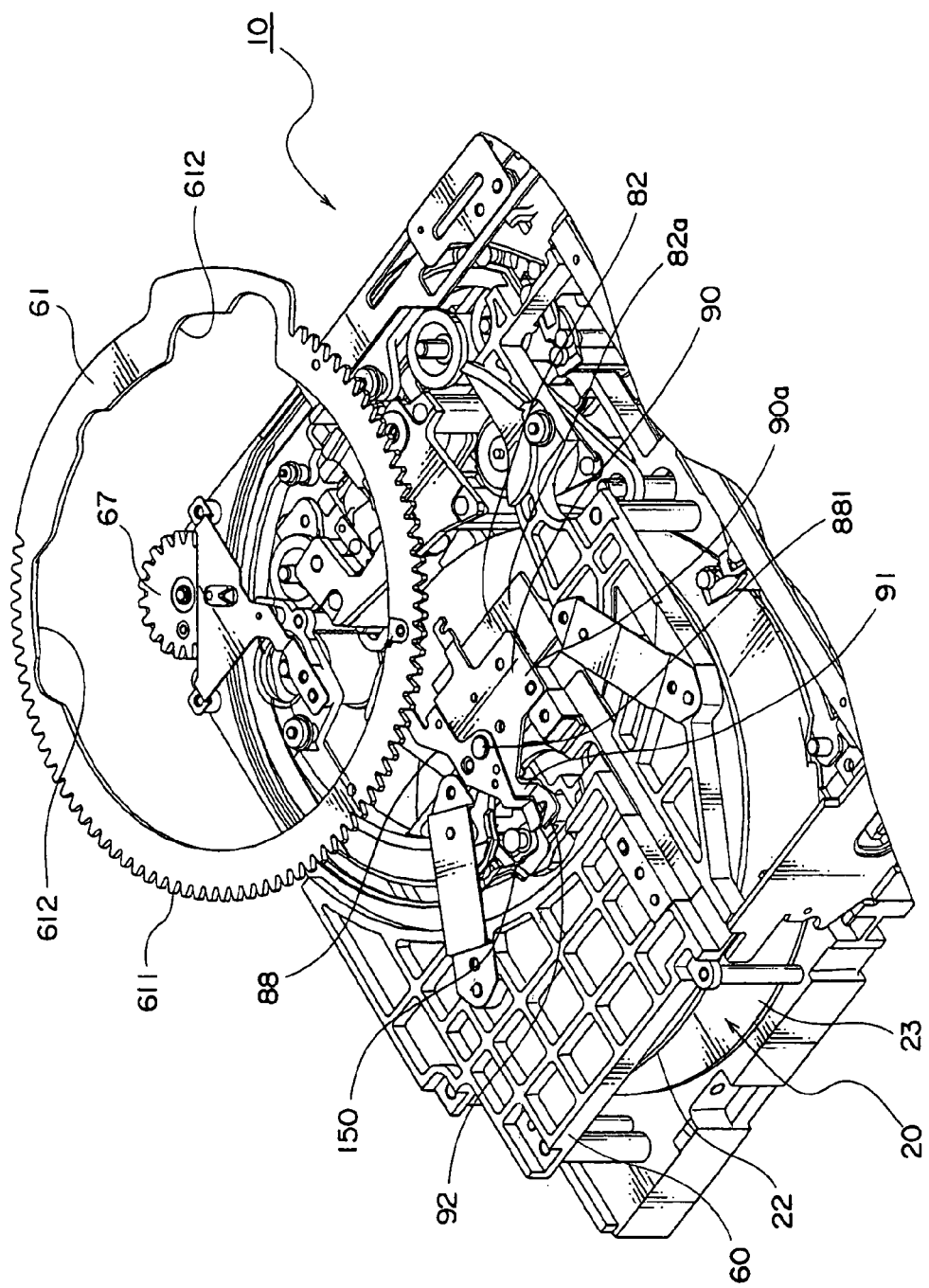
FIG. 5 is a perspective view showing a main portion of the tape drive (the recording and/or reproducing device) including a positioning member and a reception detector used in the tape drive (the recording and/or reproducing device) illustrated in FIG. 1.
Figure 6:
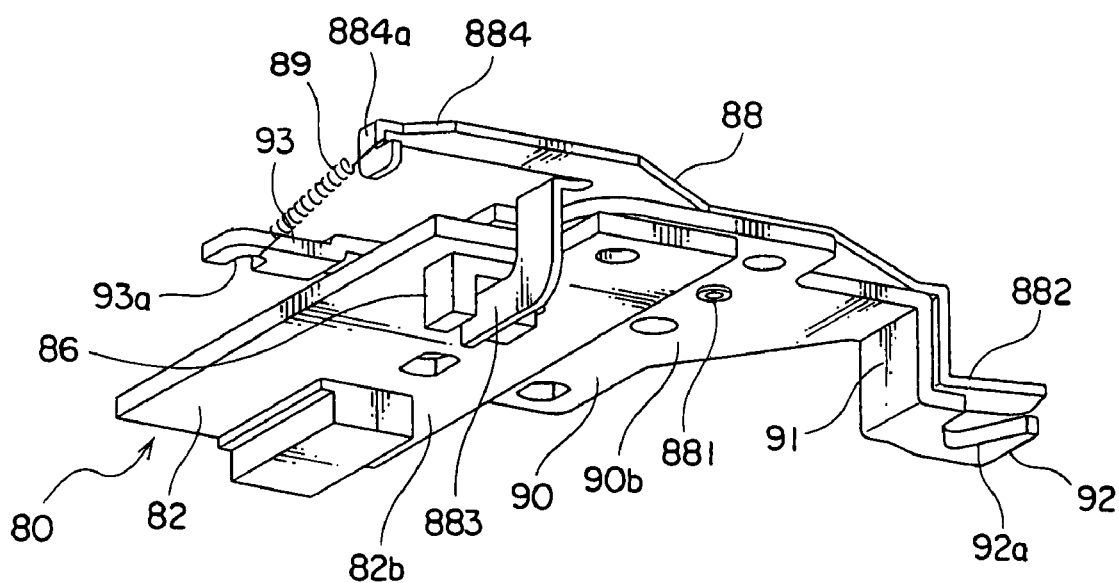
FIG. 6 is an enraged perspective view of the positioning member and the reception detector illustrated in FIG. 5.

Referring to FIGS. 5 and 6 in addition to FIGS. 1 through 3, the description will proceed to the reception detector 80 and a positioning member 90. The reception detector 80 is for detecting whether or not the pull-out assembly 150 is received in the interior of the reel hub 21 of the take-up reel 20. The positioning member 90 is for positioning the grabber shaft 90. FIG. 5 is a perspective view showing a main portion of the tape drive 10 including the positioning member 90 and the reception detector 80. FIG. 6 is an enlarged perspective view showing the positioning member 90 and the reception detector 80.

The description first will be directed to the positioning member 90. The positioning member 90 is fixedly mounted on the base 60. The positioning member 90 comprises a positioning arm 91 which extends to a center portion of the take-up reel 20 in a radial direction. The positioning arm 91 has a catcher 92 at a tip thereof. The catcher 92 positions in a rotation center portion of the take-up reel 20 and has a V-shaped groove 92a for catching the grabber shaft 632.

The V-shaped groove 92a preferably has an angle between 60 degrees and 90 degrees, both inclusive. This reason is as follows. If the angle of the V-shaped groove 92a is narrower than 60 degrees, the V-shaped groove 92a has a length which is too long and it is difficult to positioning the grabber shaft 632 at a predetermined position. If the angle of the V-shaped groove 92a is wider than 90 degrees, it is difficult to move the grabber shaft 632 up to the predetermined position of the V-shaped groove 92a at the back thereof under the influence of friction and so on.

At any rate, the V-shaped groove 92a of the catcher 92 serves as a uniquely positioning member for uniquely determining a position of the grabber shaft 632. Accordingly, a shape for catching the grabber shaft 632 is not restricted to the V-shaped groove 92a and may be a shape which can uniquely determining the position of the grabber shaft 632, for example, a U-shape or the like.

In addition, when the pull-out assembly 150 is received in the interior of the reel hub 21 of the take-up reel 20, the grabber shaft 632 is crimped to the V-shaped groove 92a of the catcher 92 by a crimping arrangement which will later be described. On the other hand, the grabber 15 (the pull-out assembly 150) is received in the above-mentioned slot of the take-up reel 20 and is fixed in the manner which will later be described. Thereby, the grabber shaft 632 is positioned at the predetermined position with an axis (a center) of the grabber shaft 632 substantially coincided with the axis of rotation (a center) of the take-up reel 20 and with the clearance CL held between the grabber shaft 632 and the inner wall of the through hole 15a of the grabber 15. Accordingly. Although the take-up reel 20 and the pull-out assembly 150 (the grabber 15) are rotated at a high speed, the grabber shaft 632 is always fixed to the predetermined position. As a result, it is possible to prevent the grabber shaft 632 from being in contact with the grabber 15 and no friction occurs between the grabber shaft 632 and the grabber 15. At any rate, it is possible to rotate the take-up reel 20 without adverse effect on rotation of the take-up reel 20 after the grabber 15 (the pull-out assembly 150) is received in the interior of the reel hub 21 of the take-up reel 20.

Conversely, inasmuch as there is the sufficient clearance CL between the grabber shaft 632 and the inner wall of the though hole 15a of the grabber 15, high accuracy is not required to position the grabber shaft 632 by means of the positioning member 90. In other words, although the axis (the center) of the grabber shaft 632 and the axis of rotation (the center) of the take-up reel 20 are not correctly coincided with each other with a little amount of displacement therebetween, the positioning member 90 may position the grabber shaft 632 at a degree where the grabber shaft 632 is directly not in contact with the inner wall of the through hole 15a of the grabber 15.

Now, the description will be directed to the reception detector 80. The reception detector 80 is for detecting, in cooperation with the positioning member 90, whether or not the pull-out assembly 150 is received in the receiving portion. The reception detector 80 comprises a sensor board 82, a sensor 86 mounted on the sensor board 82, and a sensor arm 88.

The sensor board 82 is disposed on a lower surface 90b of the positioning member 90 and is fixedly mounted on the base 60. In other words, the positioning member 90 is mounted on an upper surface (a main surface) 82a of the sensor board 82. On a lower surface 82b of the sensor board 82, the sensor 86 is mounted. In the example being illustrated, the sensor 86 comprises a photo-interrupter. At any rate, the sensor board 82 is fixedly mounted on the positioning member 90.

On the other hand, the sensor arm 88 is rotatably mounted on the upper surface (the main surface) 90a of the positioning member 90 around a rotation axis 881. The sensor arm 88 turns the sensor 86 on or off in the manner which will later be described. The sensor arm 88 comprises an engaging arm 882 and a shielding arm 883. The engaging arm 882 extends from the rotation axis 881 up to on the catcher 92 to engage with the grabber shaft 632 (see FIG. 3) in the manner which will later be described. The shielding arm 883 extends from the rotation axis 881 downward in a L-shape fashion to control shielding/opening of the photo-interrupter 86.

In addition, the sensor arm 88 comprises an urging arm 884 which extends in the opposite direction to the engaging arm 882. The urging arm 884 has a hook portion 884a at a tip thereof that is for engaging with a first end of a tensile spring 89. On the other hand, the positioning member 90 comprises an extending portion 93 which extends in the opposite direction to the positioning arm 91. The extending portion 93 has a notch 93a at a tip thereof that is for engaging with a second end of the tensile spring 89. That is, the tensile spring 89 is constructed between the hook portion 884a of the urging arm 884 and the notch 93a of the extending portion 93. By means of the tensile spring 89, the sensor arm 88 is urged in a direction where the shielding arm 883 always shields the photo-interrupter 86 (in a clockwise direction around the rotation axis 881), as shown in FIG. 6.

In a state where the photo-interrupter 86 is shielded by the sensor arm 88, the shielding arm 883 engages with an edge of the positioning member 90 and therefore further rotation of the sensor arm 88 in the clockwise direction is stopped as shown in FIG. 6.

Figure 9:
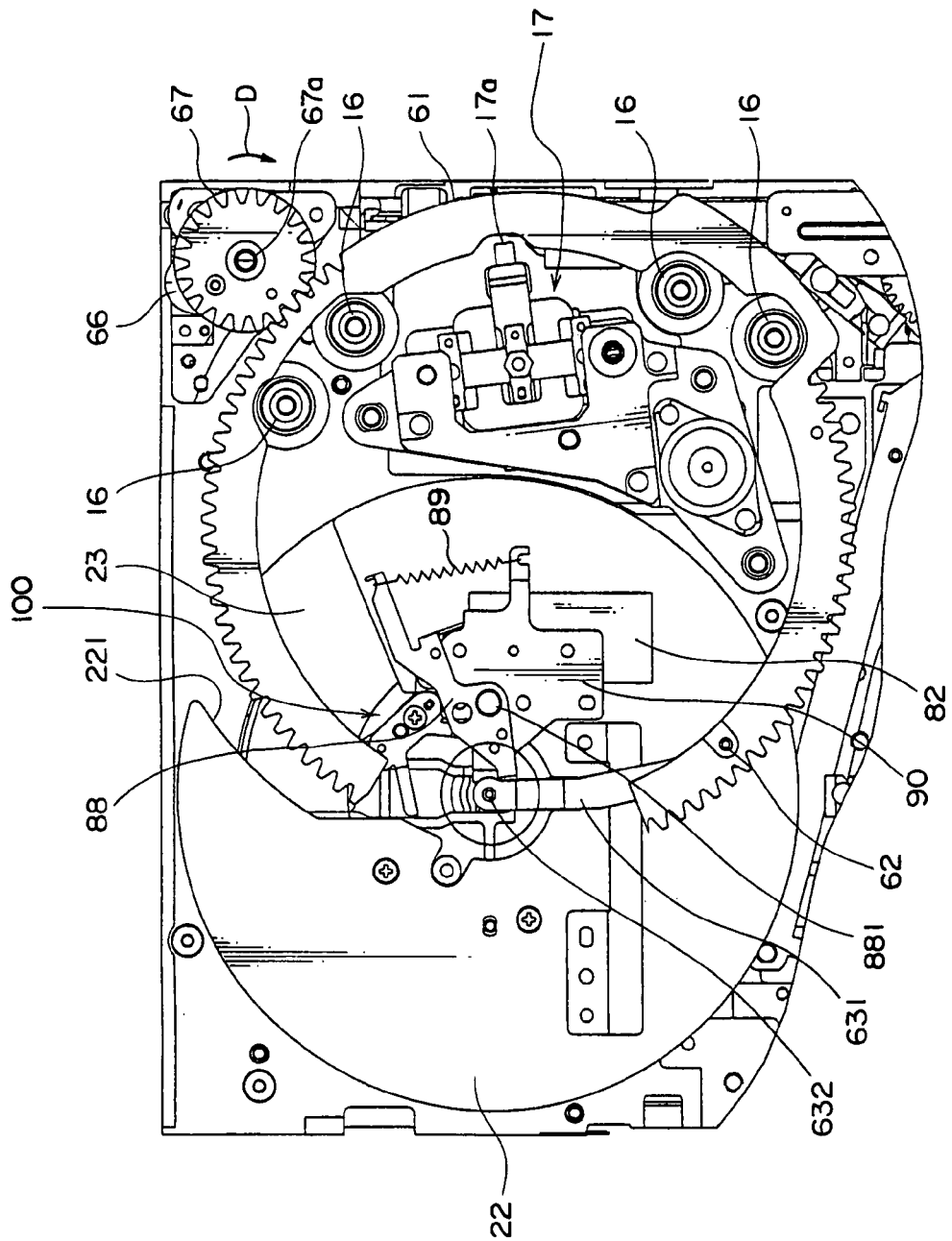
FIG. 9 is a plan view showing the main portion of the tape drive (the recording and/or reproducing device) in a state where a grabber shaft is crimped to a V-shaped groove of a catcher.
Figure 10:
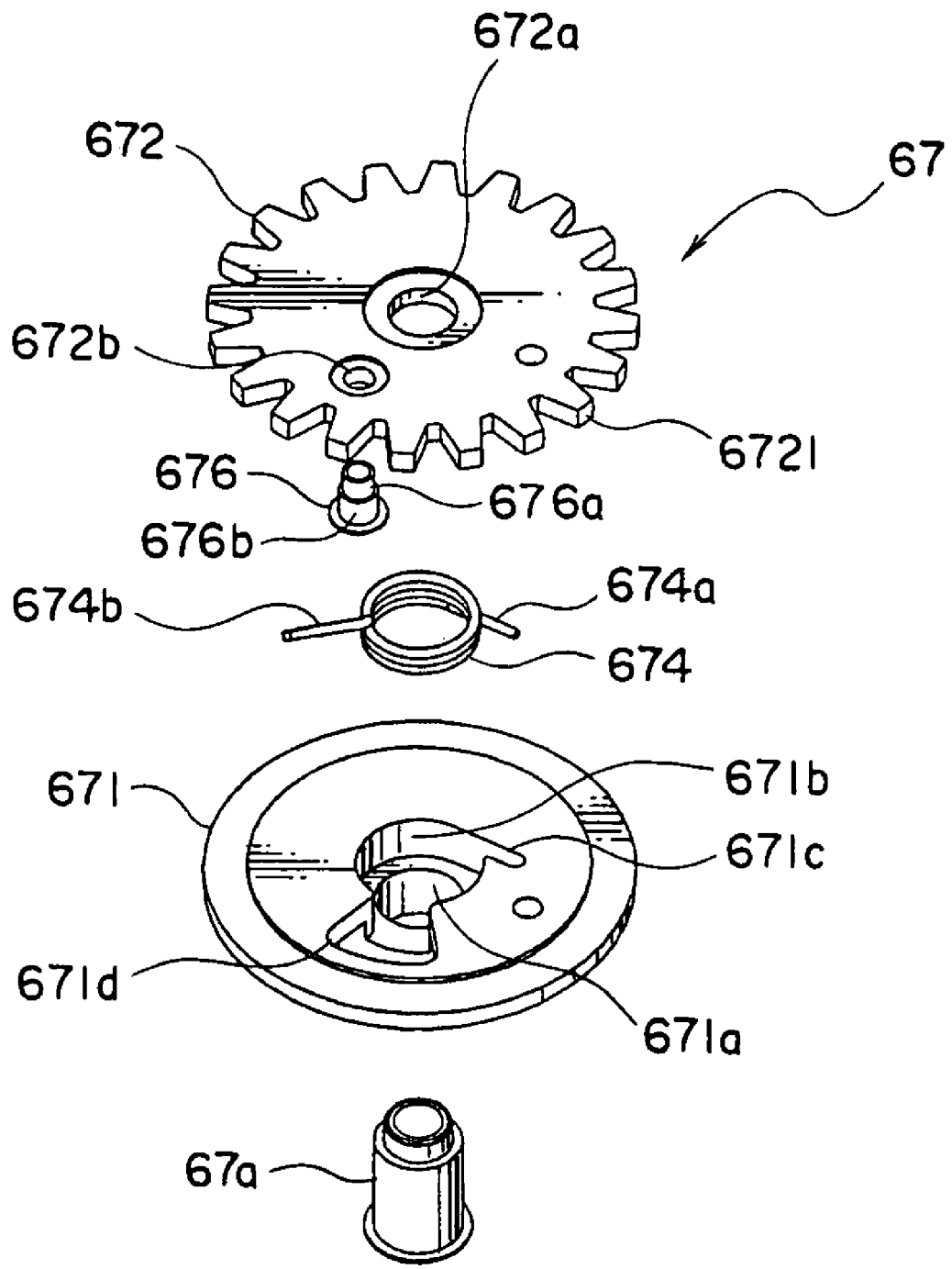
FIG. 10 is an exploded perspective view of a clutch gear serving as a crimping arrangement for crimping the grabber shaft to the V-shaped groove of the catcher.

Referring now to FIGS. 7A, 7B, 8A, 8B, 9, and 10, description will be regards operation where the pull-out assembly 150 is moved in the interior of the reel hub 21 of the take-up reel 20. FIG. 7A is a plan view showing the main portion of the tape drive 10 in the state just before the pull-out assembly 150 is entered in the interior (the receiving portion) of the reel hub 21 of the take-up reel 150. FIG. 7B is a perspective view showing a state of the reception detector 80 in the state illustrated in FIG. 7A. FIG. 8A is a plan view showing the main portion of the tape drive 10 in the state where the pull-out assembly 150 is entered in the interior (the receiving portion) of the reel hub 21 of the take-up reel 150. FIG. 8B is a perspective view showing a state of the reception detector 80 in the state illustrated in FIG. 8A. FIG. 9 is a plan view showing the main portion of the tape drive 10 in the state where the grabber shaft 632 is pushed in the V-shape groove 92 of the catcher 92. FIG. 10 is an exploded perspective view of the clutch gear 76 which acts as a crimping arrangement for crimping the grabber shaft 632 to the V-shape groove 92a of the catcher 92.

It will new be assumed that the pull-out assembly 150 is put into the state just before it is entered in the interior of the reel hub 21 of the take-up reel 20 as shown in FIG. 7A. In this event, the sensor arm 88 is urged around the rotation axis 881 in the clockwise direction by urging force of the torsion spring 89 and the shielding arm 883 is engaged with the edge of the positioning member 90, as shown in FIG. 7B. Accordingly, the shielding arm 883 of the sensor arm 88 shields the sensor (the photo-interrupter) 86.

Under the circumstances, by further driving the DC motor 64, the ring 61 is rotated around an axis of rotation thereof in the counterclockwise direction through the reduction gears 66 and the clutch gear 67 as shown in an arrow B of FIG. 8A. Therefore, the pull-out assembly 150 comes to enter through the slot in the interior of the reel hub 21 of the take-up reel 20.

As a result, the grabber shaft 632 enters in the V-shape groove 92a of the catcher 92. Therefore, the pull-out assembly 150 is received in the interior of the reel hub 21 of the take-up reel 20. In this event, inasmuch as the engaging arm 882 of the sensor arm 88 engages with the grabber shaft 632, the sensor arm 88 rotates around the rotation axis 881 in the counterclockwise direction against the urging force of the torsion spring 89 as shown in an arrow C of FIG. 8A.

Therefore, the shielding arm 883 of the sensor arm 88 is opened from the sensor (the photo-interrupter) 86 as shown in FIG. 8B. Thereby, the reception detector 80 detects (determines) that the pull-out assembly 150 is received in the interior of the reel hub 21 of the take-up reel 20 at the predetermined portion. The reception detector 80 sends a detected signal to a control circuit (not shown).

Responsive to the detected signal, the control circuit stops the driving of the DC motor 64 after making the DC motor 64 further rotate during a predetermined time interval. Therefore, by the crimping arrangement of the clutch member 67 which will presently be described, the grabber shaft 632 is crimped to the V-shaped groove 92a of the catcher 92.

Referring now to FIG. 10, the description will proceed to the clutch member 67 serving as the crimping arrangement into detail.

The clutch member 67 comprises a rotation axis 67a, a lower clutch gear 671, and an upper clutch gear 672. The rotation axis 67 fixedly stands on the base 60. The lower clutch gear 671 is rotatably mounted around the rotation axis 67a. The upper clutch gear 672 is rotatably mounted on the lower clutch gear 671 around the rotation axis 67a. The lower clutch gear 671 has an axial hole 671a in which the rotation axis 67a is inserted while the upper clutch gear 672 has an axial hole 672a in which the rotation axis 67a.

The lower clutch gear 671 has a gear portion (not shown) in a bottom thereof that engages with one of the reduction gears 66 while the upper clutch gear 672 has a gear portion 6721 in an outer circumference edge thereof that engages with the gear portion 611 of the ring 61.

Between the lower clutch gear 671 and the upper clutch gear 672, a torsion spring 674 is disposed. More specifically, the lower clutch gear 671 has a cylindrical concave portion 671b for receiving the torsion spring 674. The concave portion 671 b has a diameter which is larger than that of the axial hole 671a. The lower clutch gear 671 has an engaging groove 671c for engaging with a first leg 674a of the torsion spring 674.

The clutch member 67 further comprises a shaft 676 for receiving a second leg 674b of the torsion spring 674. The shaft 676 has an upper portion 676a inserted in the a through hole 672b of the upper clutch gear 672 and a lower portion 676b which is freely inserted in a concave portion 671d of the lower clutch gear 671.

At any rate, the torsion spring 674 is disposed between the lower clutch gear 671 and the upper clutch gear 672 and is for absorbing rotation of the lower clutch gear 671 and the upper clutch gear 672.

In the clutch member 67 having such structure, it will be assumed that the control circuit further makes, in response to the detected signal, the DC motor 64 rotate during the predetermine time interval. Under the circumstances, the lower clutch gear 671 of the clutch member 67 rotates via the reduction gears 66 around the rotation axis 67a as shown in an arrow D of FIG. 9.

Therefore, through the torsion spring 674, the upper clutch gear 672 of the clutch member 67 is acted upon by force (urging force) for making it rotate around the rotation axis 67a in the clockwise direction. However, inasmuch as the grabber shaft 632 is received in the V-shaped groove 92a of the catcher 92, rotation of the ring 61 is stopped.

In other words, by the urging force of the torsion spring 674, the grabber shaft 632 is acted to force for making it to crimp to the V-shaped groove 92a of the catcher 92 through the ring 61 and the ring arm 631. That is, the torsion spring 674 serves as a crimping force imparting arrangement for imparting crimping force for making the grabber shaft 632 crimp to the V-shaped groove 92a of the catcher 92.

At any rate, when the pull-out assembly 160 is received in the interior (the receiving portion) of the reel hub 21 of the take-up reel 20, the grabber shaft 632 is always positioned and fixed to the predetermined position by crimping between the grabber shaft 632 and the V-shapes groove 92a of the catcher 92. At the predetermined position, the center axis of the grabber shaft 632 coincides with the center axis (the rotation of axis) of the take-up reel 20 in the manner which is described above. It is therefore possible for the take-up reel 20 to rotate the grabber shaft 632 around the center axis.

In addition, the tape drive 10 is constructed so as to close the opening 21a of the reel hub 21 by an open/close door 101-1 of a shutter 100 which will later be described when the pull-out assembly 150 is received in the interior (the receiving portion) of the reel hub 21 of the tack-up reel 20. When the open/close door 101-1 of the shutter 100 closes the opening 21a of the reel hub 21, an outer circumferential surface of the open/close door 101-1 of the shutter 100 forms a part of the magnetic tape winding surface of the take-up reel 20. That is, a combination of the outer circumferential surface of the open/close door 101-1 of the shutter 100 and the outer circumferential surface of the reel hub 21 of the take-up reel 20 forms a perfect circular (precise) cylindrical magnetic tape winding surface. In other words, it is possible to make the magnetic tape winding surface substantially put into no uneven state. It is possible to take up the magnetic tape MT at a constant speed.

In addition, by rotatably driving a reel motor (not shown) for rotating the take-up reel 20 by the control circuit after the pull-out assembly 150 is received in the interior (the receiving portion) of the reel hub 21 of the take-up reel 20 in the manner which is described above, the take-up reel 20 also rotates and the magnetic tape MT is wounded on the outer circumferential surface (the magnetic tape winding surface) of the reel hub 21 of the take-up reel 20. Accordingly, the magnetic tape MT is wounded on the reel hub 21 of the take-up reel 20 with stability.

Figure 11:
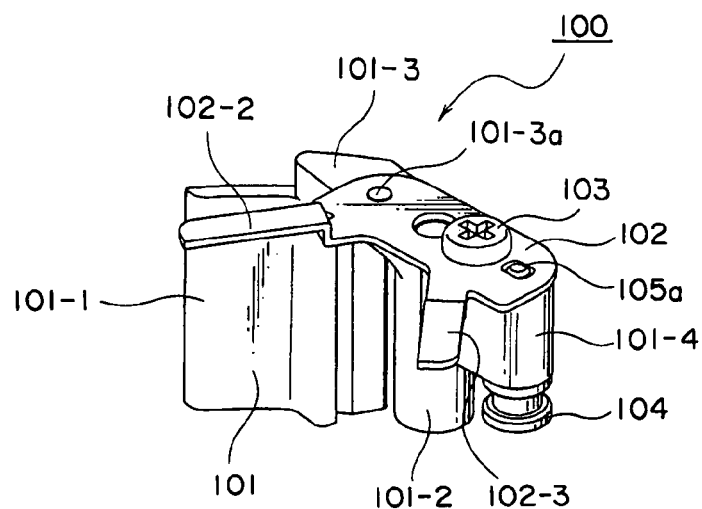
FIG. 11 is a perspective view showing a main portion of a shutter used in the tape drive (the recoding and/or reproducing device) illustrated in FIG. 1.
Figure 12:
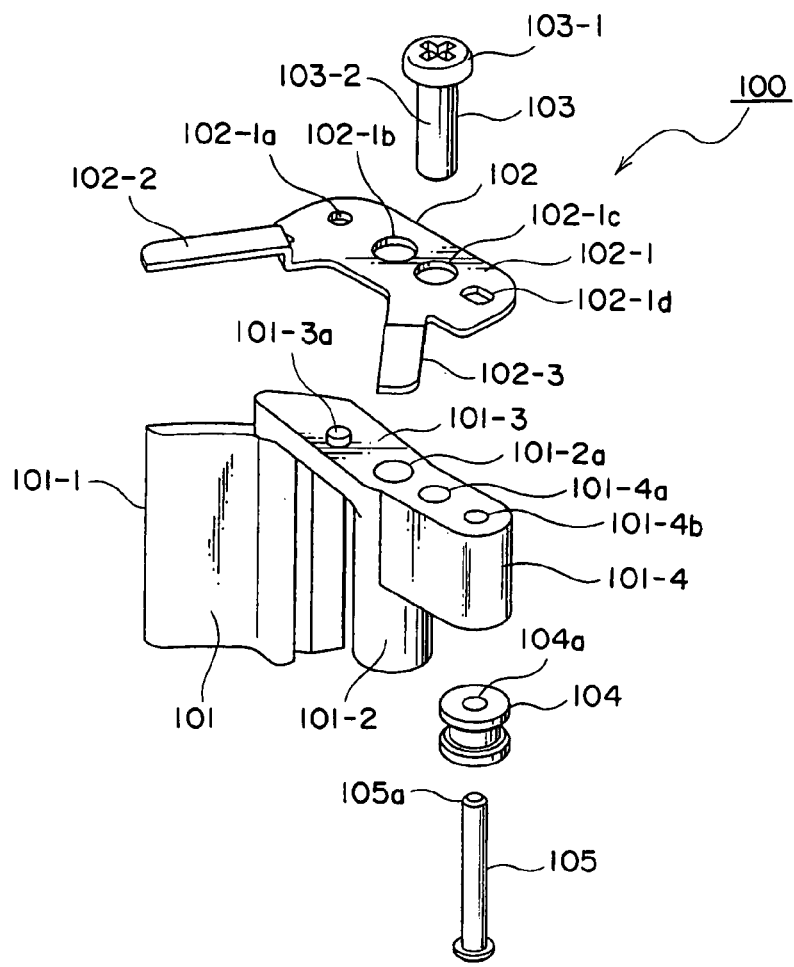
FIG. 12 is an exploded perspective view of the main portion of the shutter illustrated in FIG. 11.
Figure 13:
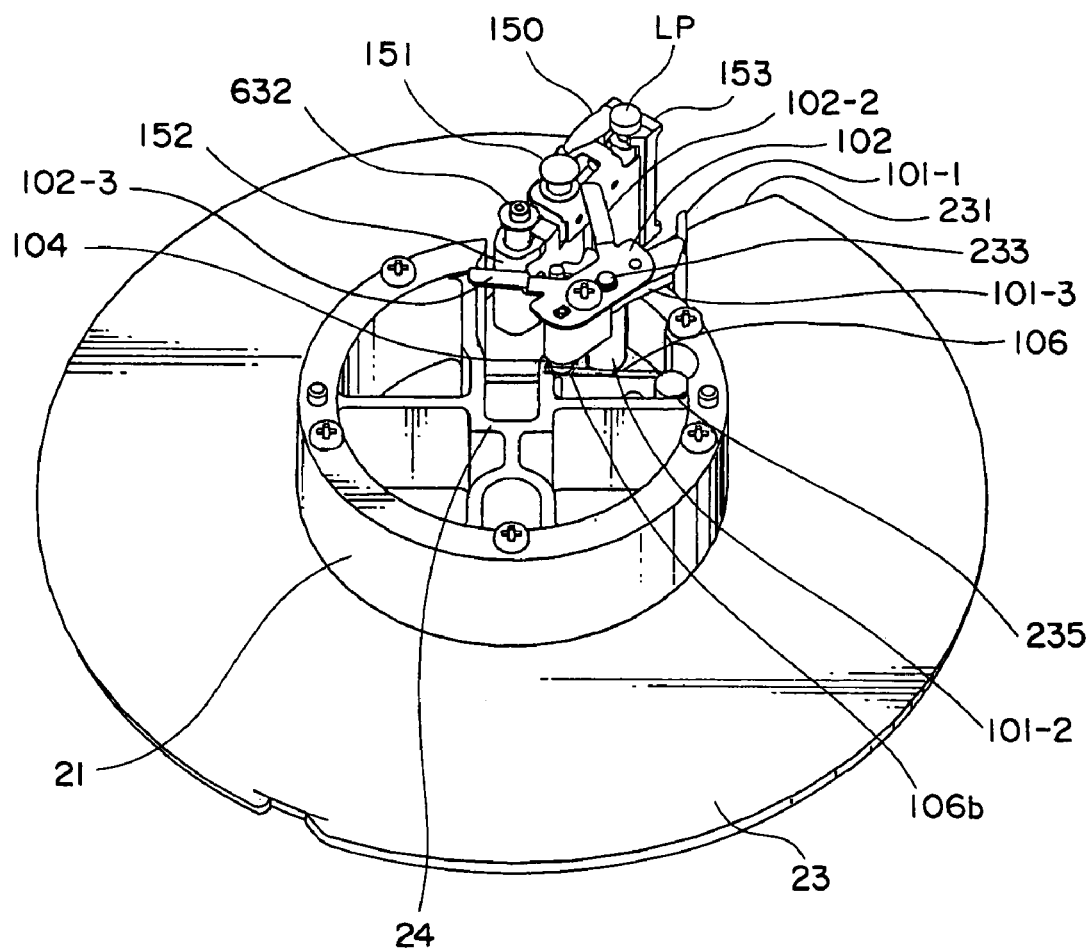
FIG. 13 is a perspective view of the take-up reel on which the shutter illustrated in FIG. 11 is mounted with an upper flange omitted together with the pull-out assembly.

Referring to FIGS. 11 through 13, the description will proceed to the shutter 100. FIG. 11 is a perspective view showing a main portion of the shutter 100. FIG. 12 is an exploded perspective view of the main portion of the shutter 100 illustrated in FIG. 11. FIG. 13 is a perspective view showing the take-up reel 20 on which the shutter 100 is mounted in a state of omitting the upper reel flange 22 together with the pull-out assembly 150.

The shutter 100 comprises a shutter body 101 having the open/close door 101-1 and a shutter open/close arm 102 for making the shutter body 101 open and close. The shutter open/close arm 102 is fixedly mounted to the shutter body 101 by means of a screw 103.

The shutter body 101 comprises a cylindrical portion 101-2, a bridging portion 101-3, and a roller mounting portion 101-4 having a heavy wall thickness. The cylindrical portion 101-2 is disposed apart from the open/close door 101-1 to extend up and down. The bridging portion 101-3 couples (bridges) the open/close door 101-1 to the cylindrical portion 101-2 at an upper end thereof and extends in a horizontal direction. The roller mounting portion 1014 extends from the cylindrical portion 101-2 in the opposite direction to the bridging portion 101-3 in order to mount a roller 104.

The shutter open/close arm 102 is mounted on the bridging portion 101-3 and the roller mounting portion 101-4. More specifically, the shutter open/close arm 102 comprises a mounting plate 102-1, and first and second engaging arms 102-2 and 102-3. The mounting plate 102-1 is mounted on the bridging portion 101-1 and the roller mounting portion 101-4 to extend in the horizontal direction. The first and the second engaging arms 102-2 and 102-3 extend from the mounting plate 102-1 in the horizontal direction. The first engaging arm 102-2 is called an outer engaging arm because it is located in a position apart from the axis of rotation (the center axis) of the take-up reel 20. The second engaging arm 102-3 is called an inner engaging arm because it is located in a position near to the axis of rotation (the center axis) of the take-up reel 20.

The bridging portion 101-3 has a positioning protrusion 101-3a for positioning the mounting plate 102-1 of the shutter open/close arm 102. The mounting plate 102-1 has a first positioning hole 102-1a in which the positioning protrusion 101-3a is inserted. The mounting plate 102-1 has an opening 102-1b at a position corresponding to a central cylindrical hole 101-2a of the cylindrical portion 101-2. In the central cylindrical hole 101-2a of the cylindrical portion 101-2 and the opening 102-1b, a rotation axis (a shutter rotation axis) which will later be describe is inserted.

The screw 103 comprises a screw head 103-1 and a screw portion 103-2. The roller mounting portion 101-4 has a screw hole 101-4a into which the screw portion 103-2 of the screw 103 is threaded. The mounting plate 102-1 has a through hole 102-1c for passing through the screw portion 103-2. Accordingly, the screw portion 103-2 of the screw 103 is threaded in the screw hole 101-4a of the roller mounting portion 104-4 through the through hole 102-1c of the mounting plate 102-1. Thereby, the shutter open/close arm 102 is fixedly mounted on the shutter body 101 by means of the screw 103.

On the other hand, the roller 104 is rotatably mounted on the roller mounting portion 101-4 at a lower portion thereof by means of a roller shaft 105. More specifically, the roller 104 has a through hole 104a through which the roller shaft 106 passes. The roller mounting portion 101-4 has a fitting hole 101-4b for fitting the roller shaft 105. The roller shaft 105 is fitted to the fitting hole 101-4b of the roller mounting portion 101-4 through the through hole 104a of the roller 104. In the manner which is described above, the roller 104 is rotatably mounted to the roller mounting portion 101-4. In this event, a tip portion 105a of the roller shaft 105 projects from an upper surface of the roller mounting portion 101-4. The mounting plate 102-a has a second positioning hole 102-1d in which the tip portion 105a of the roller shaft 105 is freely fitted. In addition, the above-mentioned first positioning hole 102-1a is a circular hole while the second positioning hole 102-1d is an oval hole.

Although illustration is omitted from FIGS. 11 and 12, the shutter 100 further comprises a torsion spring 106 for engaging with the roller 104 as shown in FIG. 13. The torsion spring 106 is for having the shutter body 101 into urging force for making the open/close door 101-1 open and close in the manner which will later be described.

As shown in FIG. 13, the open/close door 101-1 of the shutter body 101 of the shutter 100 is disposed outside the reel hub 21 of the take-up reel 20 while the cylindrical portion 101-2 of the shutter body 101 is disposed inside the reel hub 21. In addition, the bridging portion 101-3 of the shutter body 101 straddles the reel hub 21.

The illustrated take-up reel 20 is one where the reel hub 21 and the lower reel flange 23 are integrated into each other. The shutter 100 is mounted on the lower reel flange 23. More specifically, the lower reel flange 23 comprises the above-mentioned rotation axis (the shutter rotation axis) depicted at 233 and a spring fulcrum 235 inside the reel hub 21. The rotation axis 233 is for rotatably supporting (mounting) the shutter body 101. The spring fulcrum 235 is for mounting the torsion spring 106.

More specifically, the rotation axis (the shutter rotation axis) 233 is inserted in the central cylindrical hole 101-2a of the cylindrical portion 101-2 of the shutter body 101 and in the opening 102-1b of the shutter open/close arm 102. Thereby, the shutter 100 can rotate around the rotation axis (the shutter rotation axis) 233. On the other hand, the torsion spring 106 is wound and mounted around the spring fulcrum 235. The torsion spring 106 has a first leg 106a (which will later be illustrated) fixed to the take-up reel 20 and a second leg 106b which is in contact with the roller 104. Herein, the first leg 106a is called a fixed leg while the second leg 106b is called a movable leg.

Figure 14:
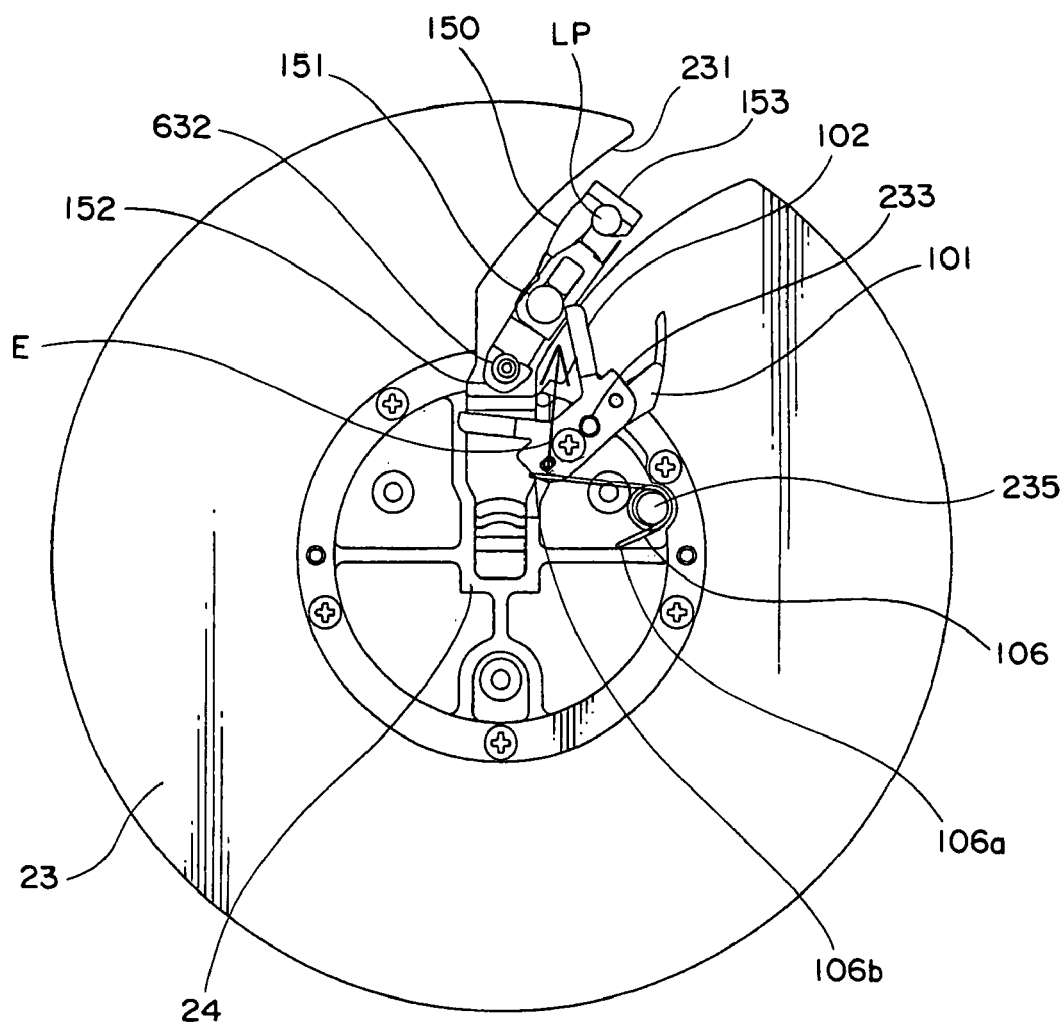
FIG. 14 is a plan view of the take-up reel (the upper flange omitted) comprising the shutter in a state where the shutter illustrated in FIG. 11 perfectly opens together with the pull-out assembly.
Figure 15:
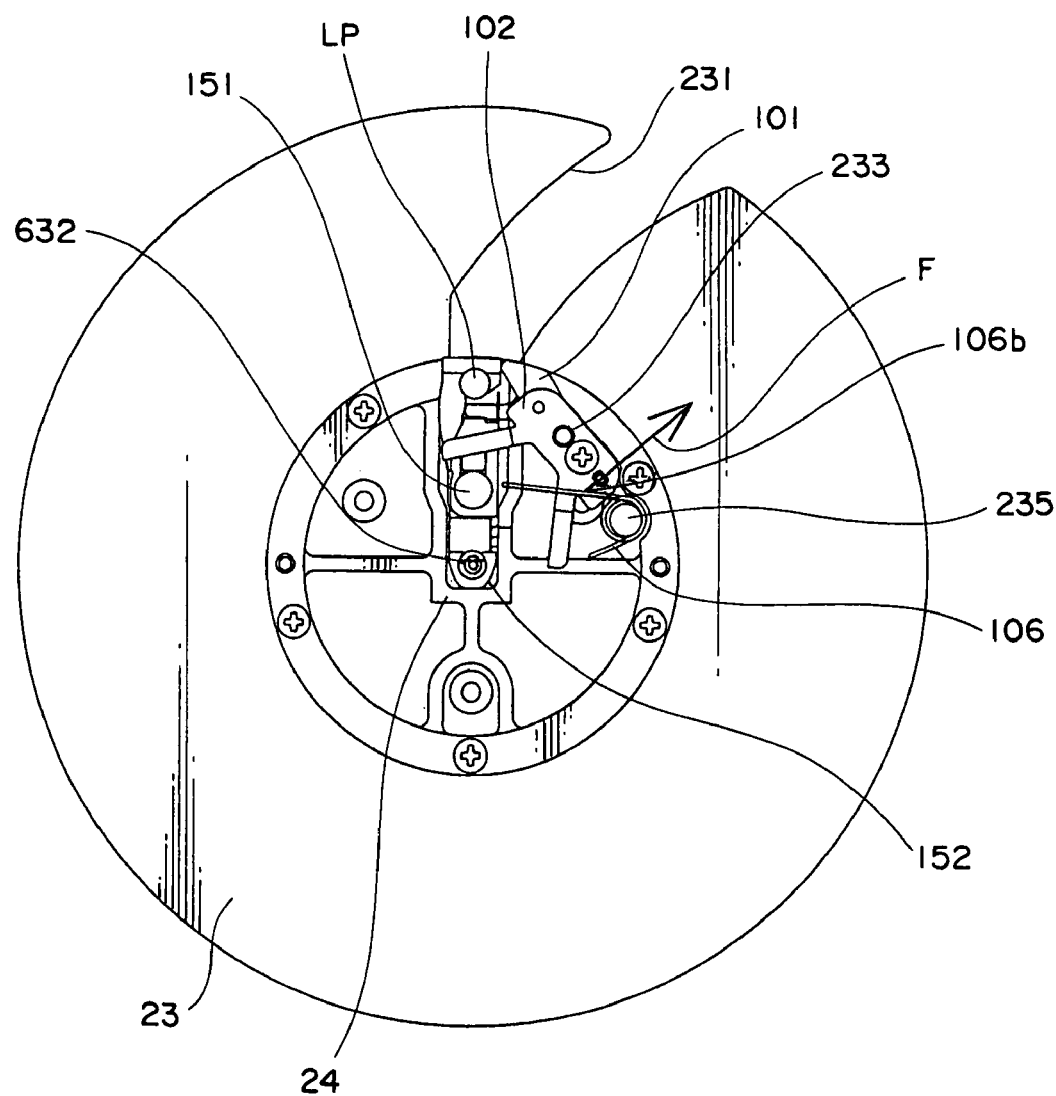
FIG. 15 is a plan view of the take-up reel (the upper flange omitted) comprising the shutter in a state where the shutter illustrated in FIG. 11 perfectly closes together with the pull-out assembly.
Figure 16:
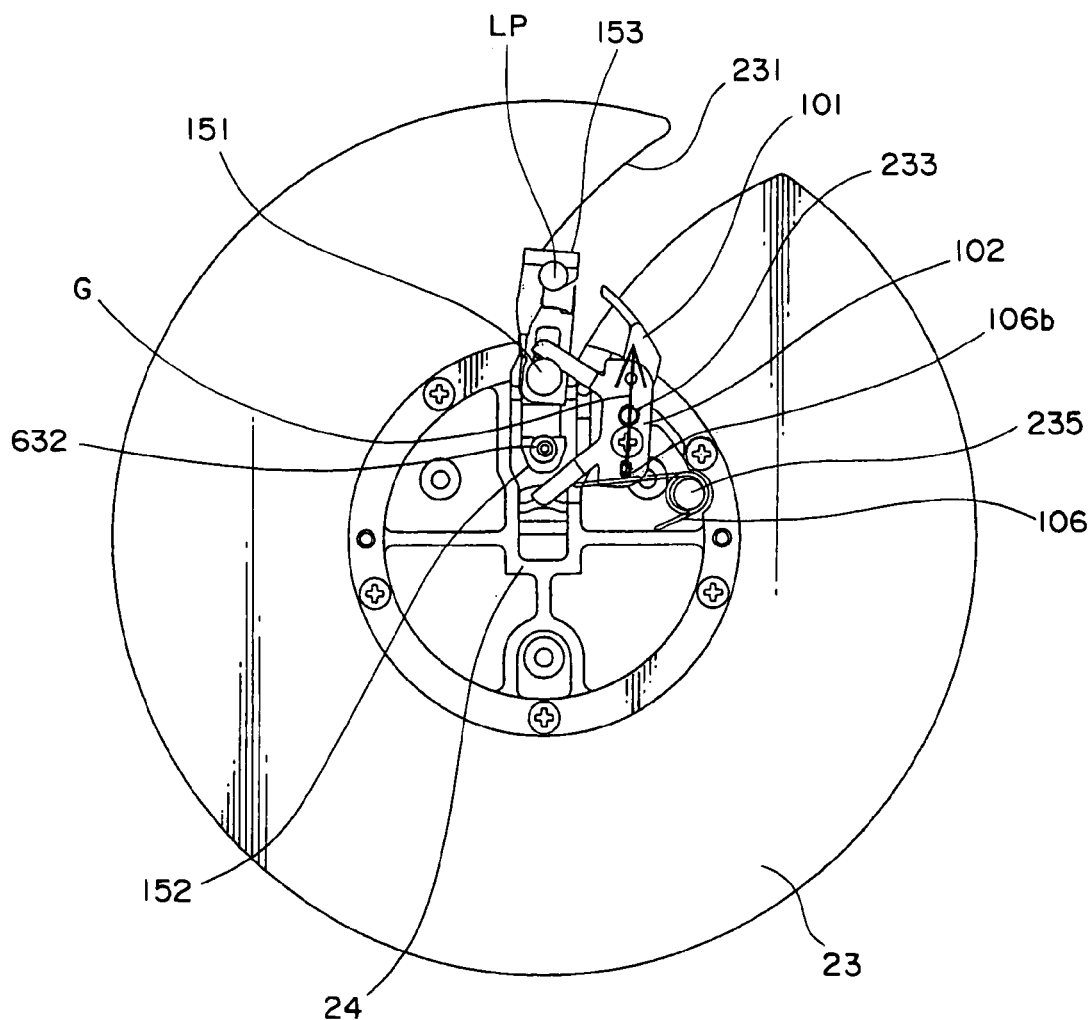
FIG. 16 is a plan view of the take-up reel (the upper flange omitted) comprising the shutter in a state where a torsion spring does not apply rotation force with respect to a shutter body (in a state where the shutter is located at a predetermined angular position) together with the pull-out assembly.

Referring now to FIGS. 14 through 16, description will be made as regards a direction of urging force of the torsion spring 106 with respect to the shutter body 101. FIG. 14 is a plan view showing the take-up reel 20 (wherein the upper reel flange 22 is omitted) comprising the shutter 100 in a state where the shutter 100 perfectly opens together with the pull-out assembly 150. FIG. 15 is a plan view showing the take-up reel 20 (wherein the upper reel flange 22 is omitted) comprising the shutter 100 in a state where the shutter 100 perfectly closes together with the pull-out assembly 150. FIG. 16 is a plan view showing the take-up reel 20 (wherein the upper reel flange 22 is omitted) comprising the shutter 100 in a state where the torsion spring does not give rotation force with respect to the shutter body 101 together with the pull-out assembly 150.

Referring first to FIG. 14, description will be made as regards the direction of the urging force of the torsion spring 106 with respect to the shutter body 101 in the state where the shutter 100 opens. In this event, the movable leg 106b of the torsion spring 106 is in contact with the roller 104 of the shutter 100 at a tip side thereof. Accordingly, the torsion spring 106 applies the shutter body 101 with the urging force so as to make it rotate around the shutter rotation axis 233 in the clockwise direction as an arrow E of FIG. 14. As a result, the shutter 100 is urged in an open direction.

Referring now to FIG. 15, description will be made as regards the direction of the urging force of the torsion spring 106 with respect to the shutter body 101 in the state where the shutter 100 closes. In this event, the movable leg 106b of the torsion spring 106 is in contact with the roller 104 of the shutter 100 at a root side thereof. Accordingly, the torsion spring 105 applies the shutter body 101 with the urging force so as to make it rotate around the shutter rotation axis 233 in the counterclockwise direction as an arrow F of FIG. 15. As a result, the shutter 100 is urged in a close direction.

Referring to FIG. 16, description will be made as regards the direction of the urging force of the torsion spring 106 with respect to the shutter body 101 in the state where the torsion spring 105 does not give rotation force with respect to the shutter body 101. In this event, the movable leg 106b of the torsion spring 106 is in contact with the roller 104 of the shutter 100 at about a middle position thereof. Accordingly, the torsion spring 105 applies the shutter body 101 with the urging force in a direction toward the shutter rotation axis 233. In other word, the rotation force of the torsion spring 106 does not act either the open direction or the open direction with respect to the shutter body 101. Under the circumstances, the shutter 100 carries out rotation operation around the shutter rotation axis 233 with grabber shaft 632 or the guide pin 151 in contact with the shutter open/close arm 102.

Herein, an angle of the shutter 100 illustrated in FIG. 16 is called a predetermined angle. When the shutter 100 is rotated around the shutter rotation axis 233 in the counterclockwise direction from a state where the open/close door 101-1 of the shutter 100 opens in illustrated FIG. 14 beyond the predetermined angle, the shutter 100 rotates in a direction to automatically close the shutter 100 caused by the urging force in the counterclockwise direction due to the above-mentioned torsion spring 106. Conversely, when the shutter 100 is rotated around the shutter rotation axis 233 in the clockwise direction from a state the open/close door 101-1 of the shutter 100 closes in the illustrated in FIG. 15 beyond the predetermined angle, the shutter 100 rotates in a direction to automatically open the shutter 100 caused by the urging force of the clockwise direction due to the above-mentioned torsion spring 106.

Referring now to FIGS. 17 through 21, description will be made as regards operation from the state where the shutter 100 perfectly opens up to the state where the shutter 100 perfectly closes.

Figure 17:
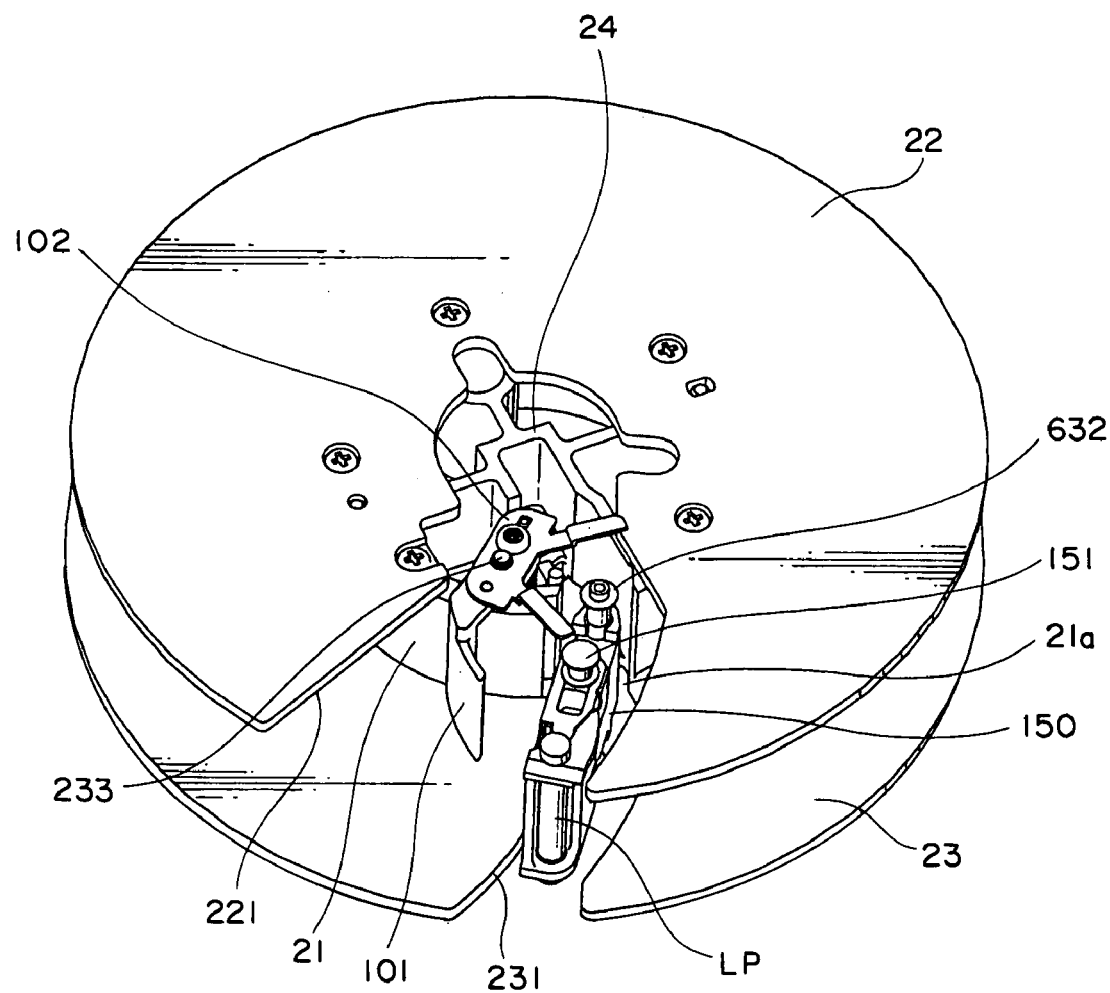
FIG. 17 is a perspective view of the take-up reel comprising the shutter in the state where the shutter illustrated in FIG. 11 perfectly opens together with the pull-out assembly.

FIG. 17 is a perspective view showing the take-up reel 10 comprising the shutter 100 in the state where the shutter 100 perfectly opens together with the pull-out assembly 150. In this state, the shutter 100 is put into a perfectly opened state by the urging force of the torsion spring 106 around the shutter rotation axis 233 in the clockwise direction in the manner which is described above.

Figure 18:
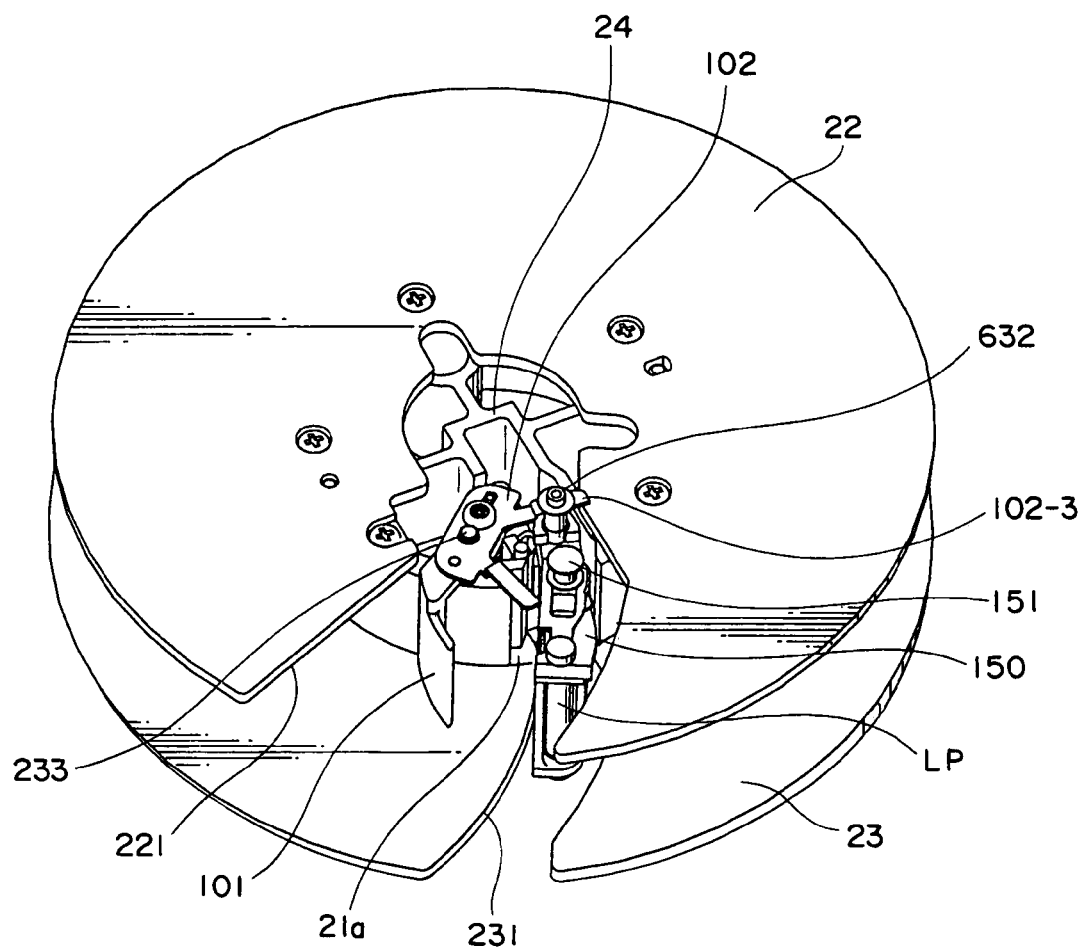
FIG. 18 is a perspective view of the take-up reel comprising the shutter in a state where a grabber shaft is engaged with an inside engaging arm of a shutter open/close arm together with the pull-out assembly.

In this state, it will be assumed that the ring 61 is rotated around the axis of rotation thereof in the counterclockwise direction by means of driving force of the DC motor 64. As a result, coupled to the ring 61 through the ring shaft 62, the sing arm 631, and the grabber shaft 631, the pull-out assembly 150 moves toward the receiving portion of the take-up reel 20. Accordingly, the grabber shaft 632 engages with the inside engaging arm 102-3 of the shutter open/close arm 102 as shown in FIG. 18.

Figure 19:
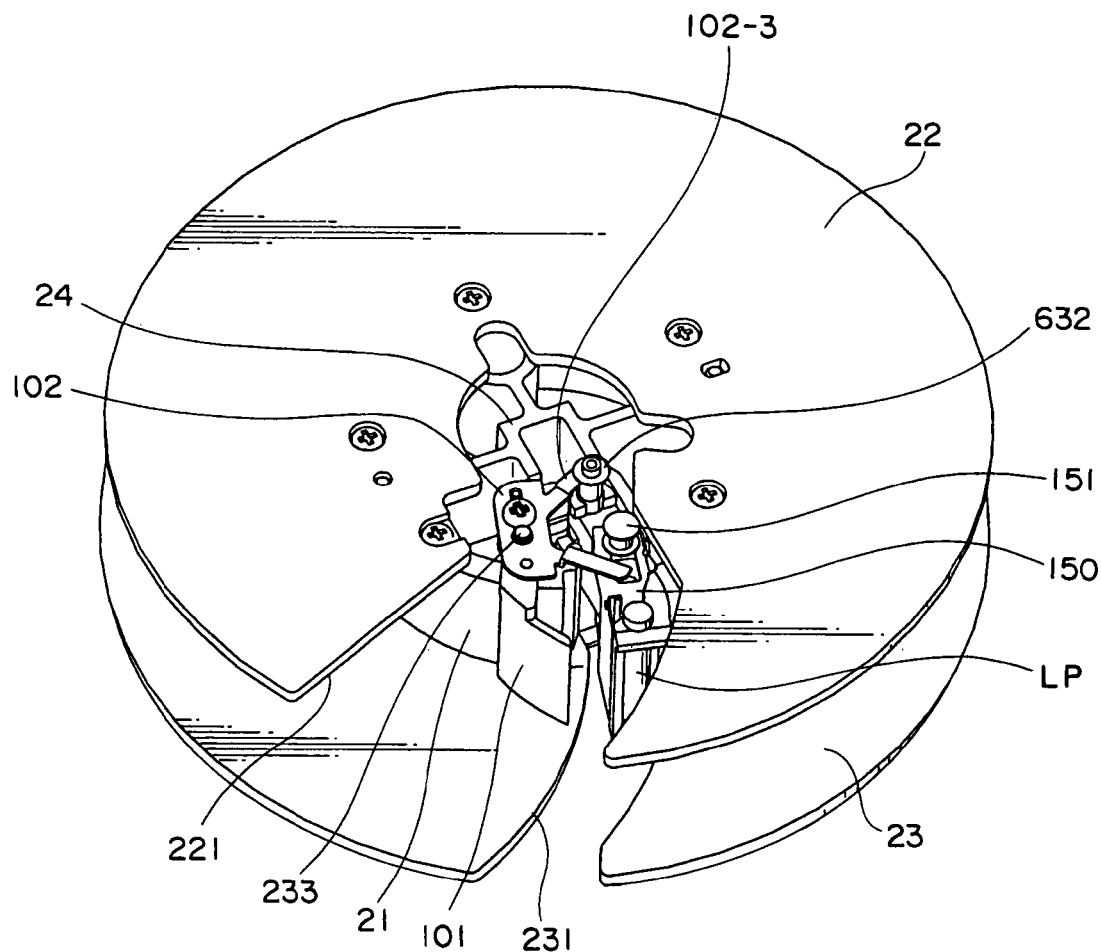
FIG. 19 is a perspective view of the take-up reel comprising the shutter in a state where the shutter is rotated in a counterclockwise direction with the grabber shaft engaged with the inside engaging arm of the shutter open/close arm together with the pull-out assembly.

When the ring 61 is proceeded to rotate around the axis of rotation thereof in the counterclockwise direction, the shutter 100 rotates around the shutter rotation axis 233 in the counterclockwise direction against the urging force of the torsion spring 106 with the grabber shaft 632 engaged with the inside engaging arm 102-3 of the shutter open/close arm 102 as shown in FIG. 19.

Figure 20:
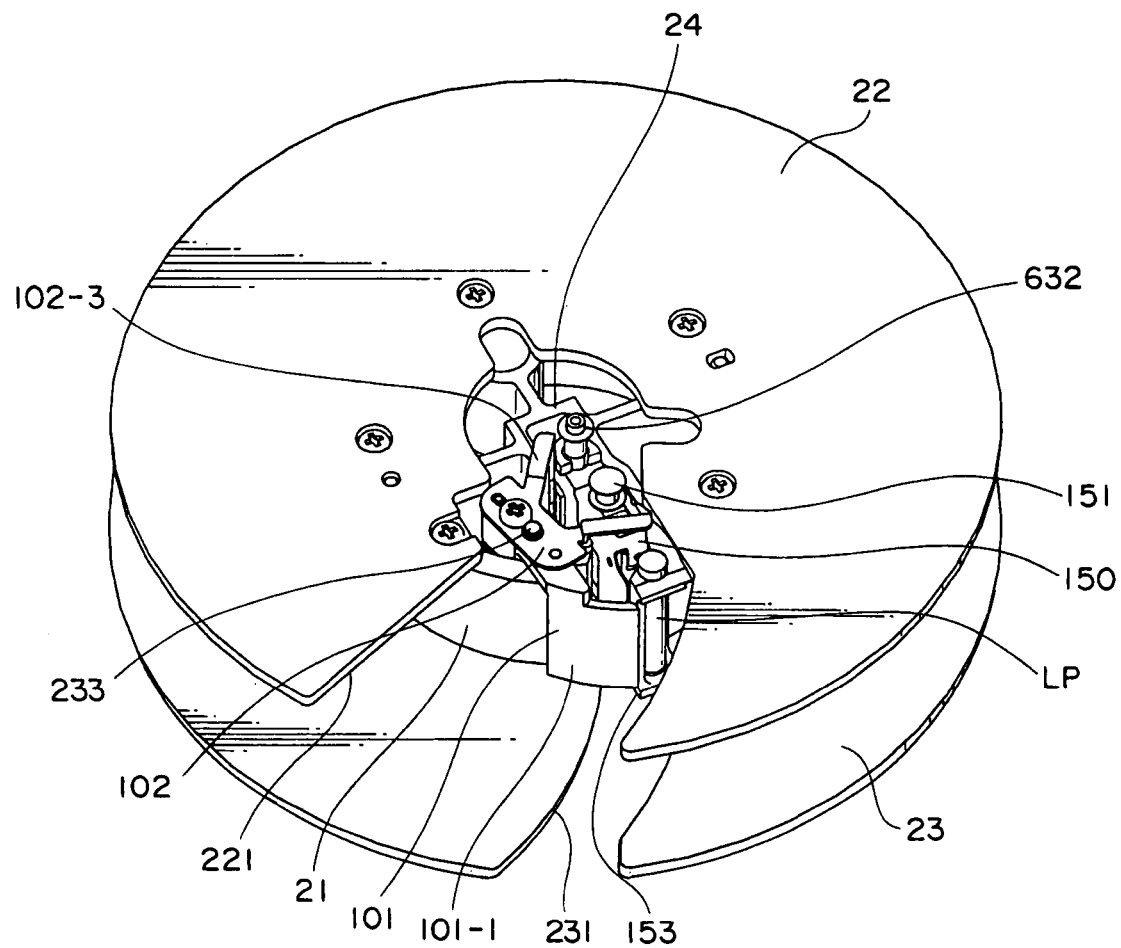
FIG. 20 is a perspective view of the take-up reel comprising the shutter in a state where an open/close door of the shutter is engaged with a rear end of the pull-out assembly together with the pull-out assembly.

When the ring 61 is furthermore rotated around the axis of rotation thereof in the counterclockwise direction, the shutter 100 exceeds the predetermined angle illustrated in FIG. 16 and rotates around the shutter rotation axis 233 in the counterclockwise direction. As a result, inasmuch as the torsion spring 106 applies the shutter body 101 with the urging force in the direction to close the shutter 100, the shutter 100 itself (automatically) rotates in the close direction (in the counterclockwise direction). Therefore, the open/close door 101-1 of the shutter 100 engages with the rear end 153 of the pull-out assembly 150 as shown in FIG. 20 and the pull-out assembly 150 is acted upon by force so as to press it in the receiving portion side. As a result, as shown in FIG. 21, the pull-out assembly 150 is perfectly received in the receiving portion with the head end 152 of the pull-out assembly 150 stopped by the stopper 24 and the shutter 100 is put into a perfectly close state.

In the manner which is described above, the pull-out assembly 150 is fixed in the interior of the receiving portion at the predetermined position. That is, the shutter 100 comprising the torsion spring 106 serves as a fixing arrangement for fixing the pull-out assembly 150 in the receiving portion at the predetermined position on receiving the pull-out assembly 150 in the receiving portion. In other words, the fixing arrangement (the shutter 100 comprising the torsion spring 106) acts as a pressing arrangement for pressing the head end 152 of the pull-out assembly 150 to the stopper 24. In addition, the torsion spring 106 is operable as an urging arrangement for urging the head end 152 of the pull-out assembly 150 toward the stopper 24 with the open/close door 101-1 in contact with the rear end 153 of the pull-out assembly 150 on closing the open/close door 101-1.

In addition, in the state where the pull-out assembly 150 is fixed in the receiving portion at the predetermined position in the manner which is described above, the grabber shaft 632 is crimped to the V-shaped groove 92a of the catcher 92 in the manner which is described above. Accordingly, the grabber shaft 632 is positioned with the center of the grabber shaft 632 substantially coincided with the central axis of the take-up reel 20 and with the clearance CL held between the grabber shaft 632 and the inner wall of the through hole 15a.

Figure 21:
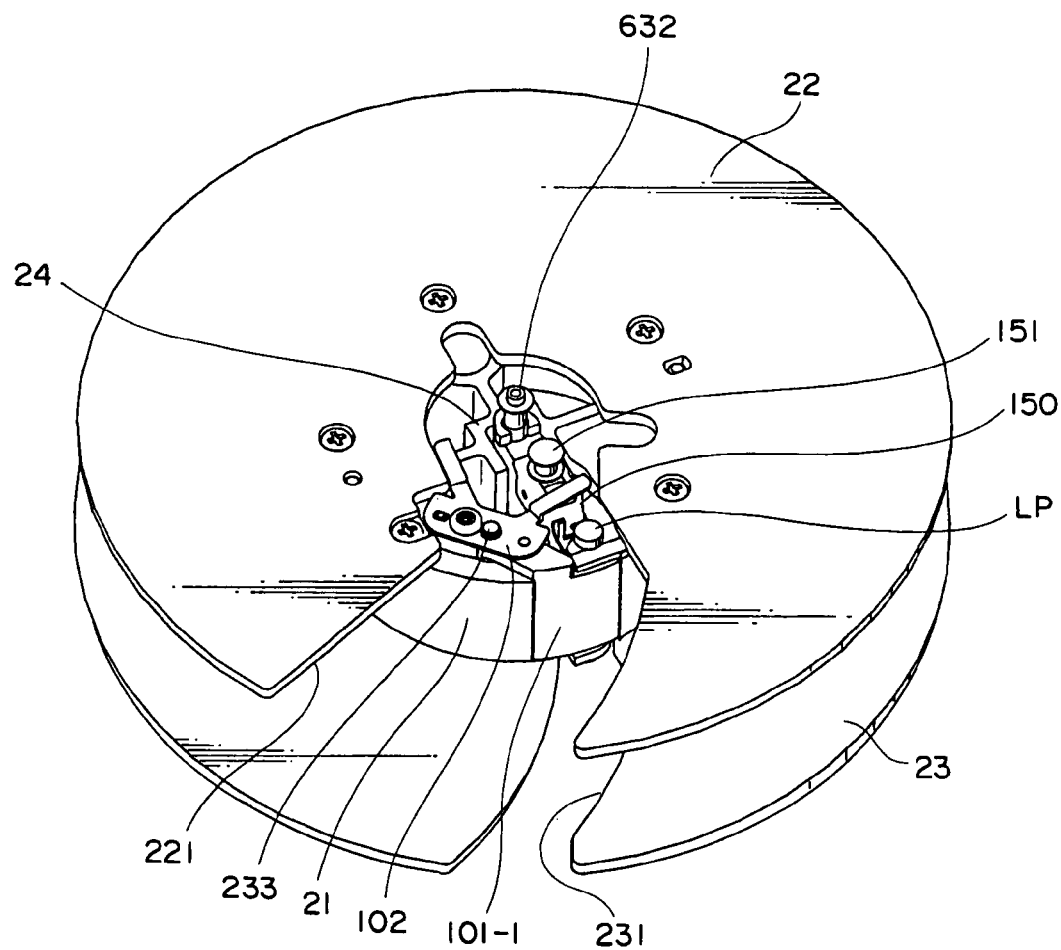
FIG. 21 is a perspective view of the take-up reel comprising the shutter in the state where the shutter illustrated in FIG. 11 perfectly closes together with the pull-out assembly.
Figure 22:
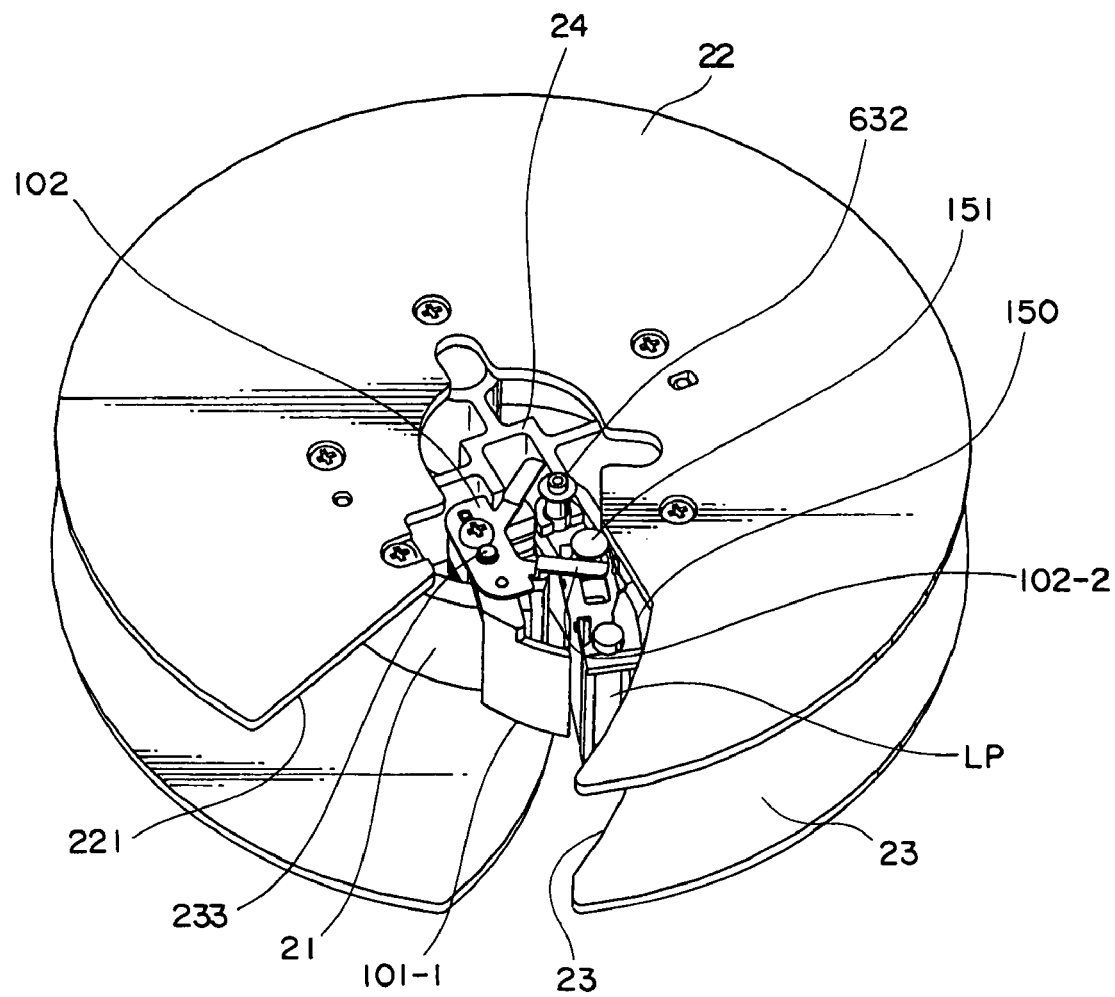
FIG. 22 is a perspective view of the take-up reel comprising the shutter in a state where a guide pin of the pull-out assembly is engaged with an outside engaging arm of the shutter open/close arm together with the pull-out assembly.

Referring now to FIGS. 21, 22, and 17, description will be made as regards operation in a case where the shutter 100 is opened from the perfectly closed state.

In the state where the shutter 100 is put into the perfectly closed state as shown in FIG. 21, the shutter 100 is always applied with the rotation force to close it by means of the urging force of the torsion spring 106 around the shutter rotation axis 233 in the counterclockwise direction. In addition, the open/close door 101-1 of the shutter 100 presses the rear end 153 of the pull-out assembly 150.

In this state, it will be assumed that the DC motor 64 is rotated in the opposite direction to the above-mentioned direction. In this event, by the driving force of the DC motor 64, the ring 61 rotates around the axis of rotation thereof in the clockwise direction. Therefore, coupled to the ring 61 via the ring shaft 62, the ring arm 631, and the grabber shaft 632, the pull-out assembly 150 moves to apart from the receiving portion against the urging force of the torsion spring 106 with the rear end 153 thereof in contact with the open/close door 101-1 of the shutter 100.

When the ring 61 is proceeded to rotate around the axis of rotation thereof in the clockwise direction, the guide pin 151 of the pull-out assembly 150 engages with the outside engaging arm 102-2 of the shutter open/close arm 102 as shown in FIG. 22. Thereafter, the shutter 100 rotates around the shutter rotation axis 233 in the clockwise direction against the urging force of the torsion spring 106 in the counterclockwise direction.

When the ring 61 is furthermore rotated around the axis of rotation thereof in the clockwise direction, the shutter 100 exceeds the predetermined angle illustrated in FIG. 16 and rotates around the shutter rotation axis 233 in the clockwise direction. As a result, inasmuch as the torsion spring 106 applies the shutter body 101 with the urging force in the direction to open the shutter 100, the shutter 100 itself (automatically) rotates in the open direction (in the clockwise direction). By the urging force of the torsion spring 106, the open/close door 101-1 of the shutter 100 is put into the perfectly open state as shown in FIG. 17.

In the manner which is described above, the shutter 100 according to the embodiment of this invention comprises an automatic shutter for automatically opening and closing, in cooperation with the pull-out shutter 150, the shutter 100 (the open/close door 101-1). Accordingly, the illustrated tape drive 10 does not require a shutter open/close mechanism for forcefully opening and closing the shutter 100 from an outside.

Figure 23:
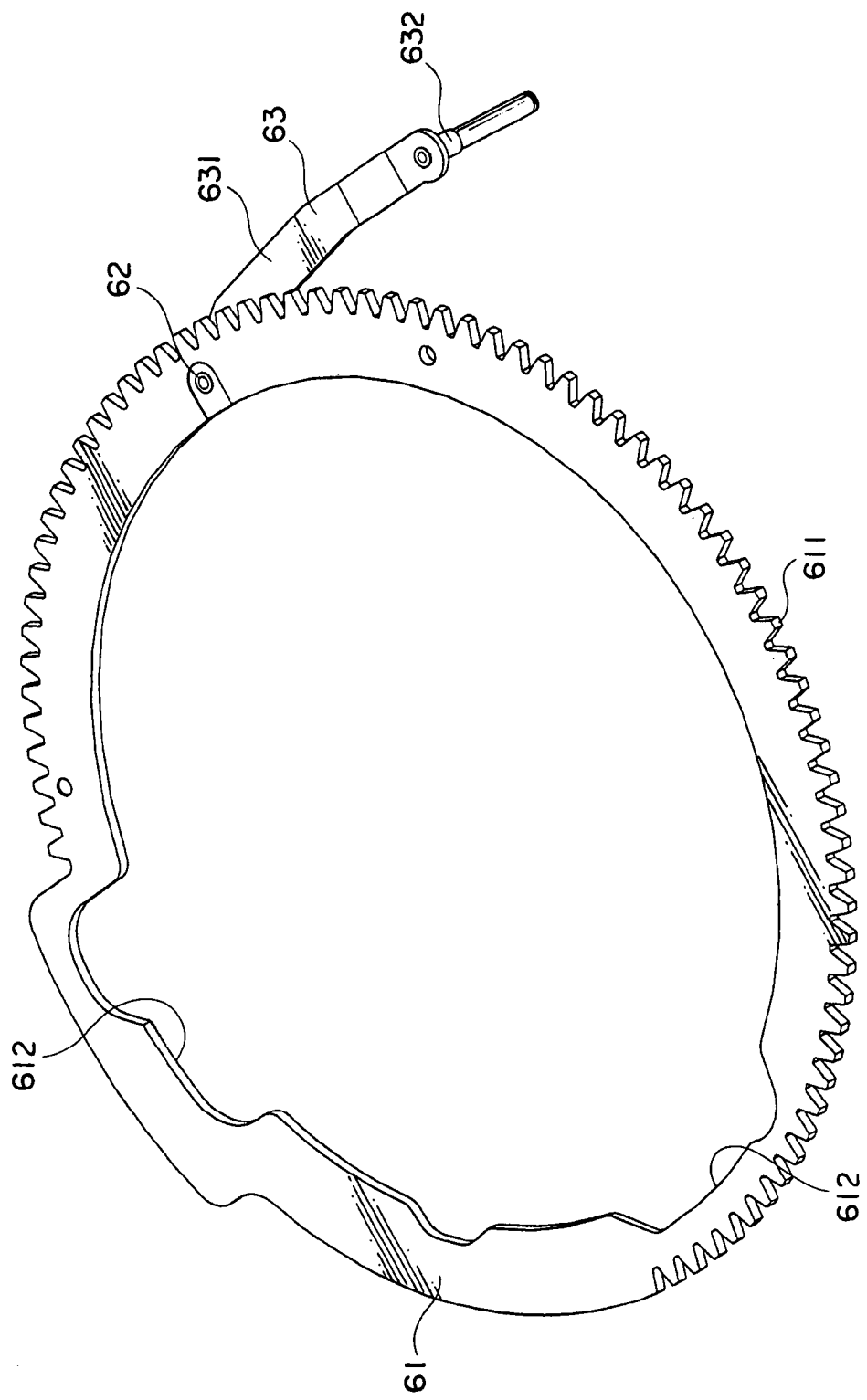
FIG. 23 is a perspective view showing a ring (the operating arrangement, the driving mechanism) used in the tape drive (the recording and/or reproducing device) illustrated in FIG. 1.

Referring to FIG. 23, the description will proceed to the ring 61 for use in the tape drive 10. In the manner which is described above, the ring 61 has the gear portion 611 at the outside circumferential edge thereof. On the other hand, the tape drive 10 comprises the four guide rollers 16 for guiding the magnetic tape.

When the grabber 15 is put into the standby state, the ring 61 covers the upper surface of the guide rollers 16. However, on running the magnetic tape, it may be necessary to adjust a height of the guide rollers 16. For example, on a production line of the tape drives 10, height adjustment of the guide rollers 16 is carried out with a signal of the magnetic tape read out of.

Accordingly, in order to enable to the height adjustment of the guide rollers 16 on running the magnetic tape after the grabber 15 is loaded (i.e. in the state where the pull-out assembly 150 is received in the interior of the real hub 21 of the take-up reel 20), the ring 61 has oddly shaped portions 612 in an inner circumferential portion (inside diameter) thereof. That is, when the grabber 15 is loaded, the oddly shaped portions 612 are located in positions corresponding to upper surfaces of the four guide rollers 16. Thereby, it is possible to insert an adjustment tool (not shown) through each of the oddly shaped portions 612.

Figure 24:
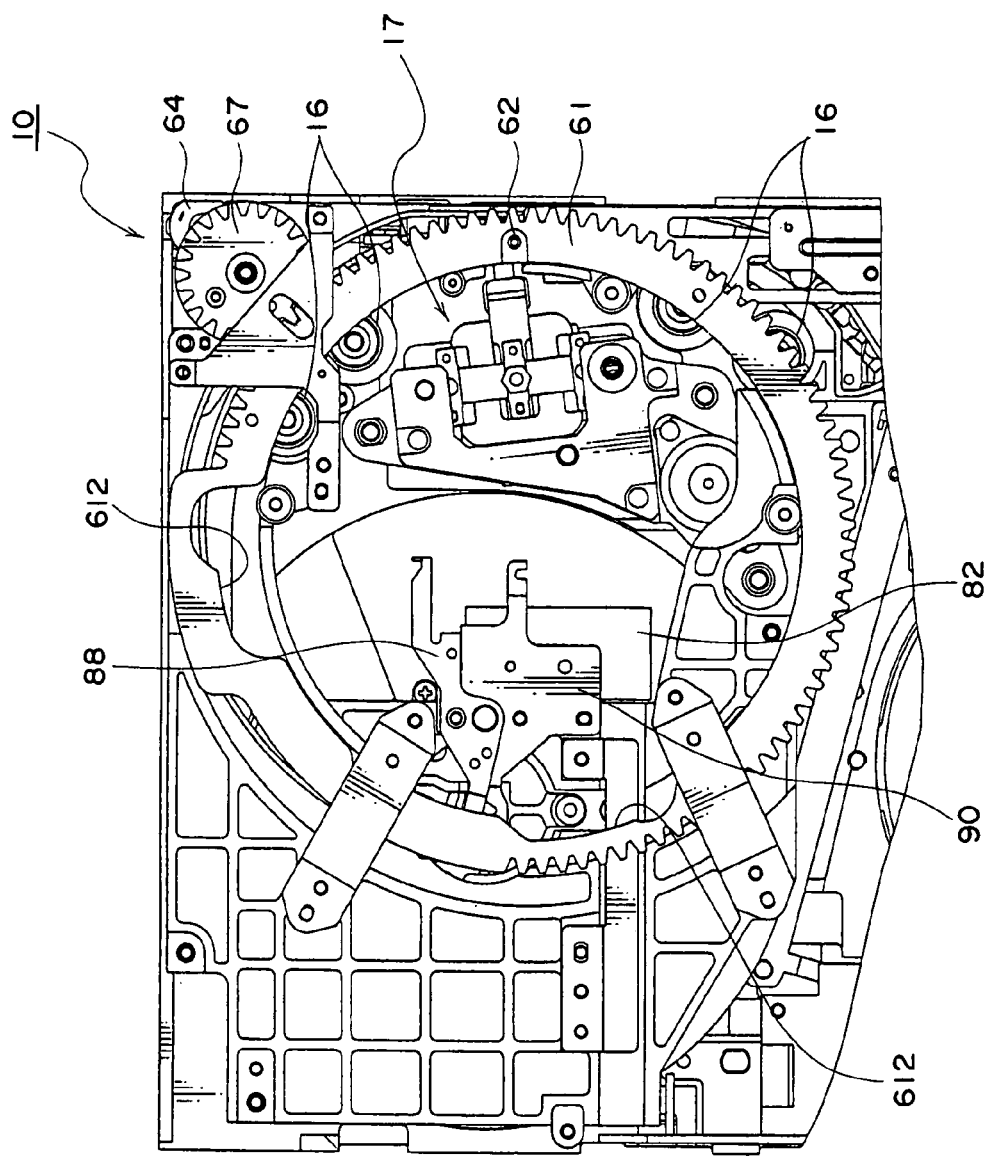
FIG. 24 is a plan view showing an arrangement relationship between the ring and four guide rollers in a case where the grabber is put into a state of an initial position (a standby state)
Figure 25:
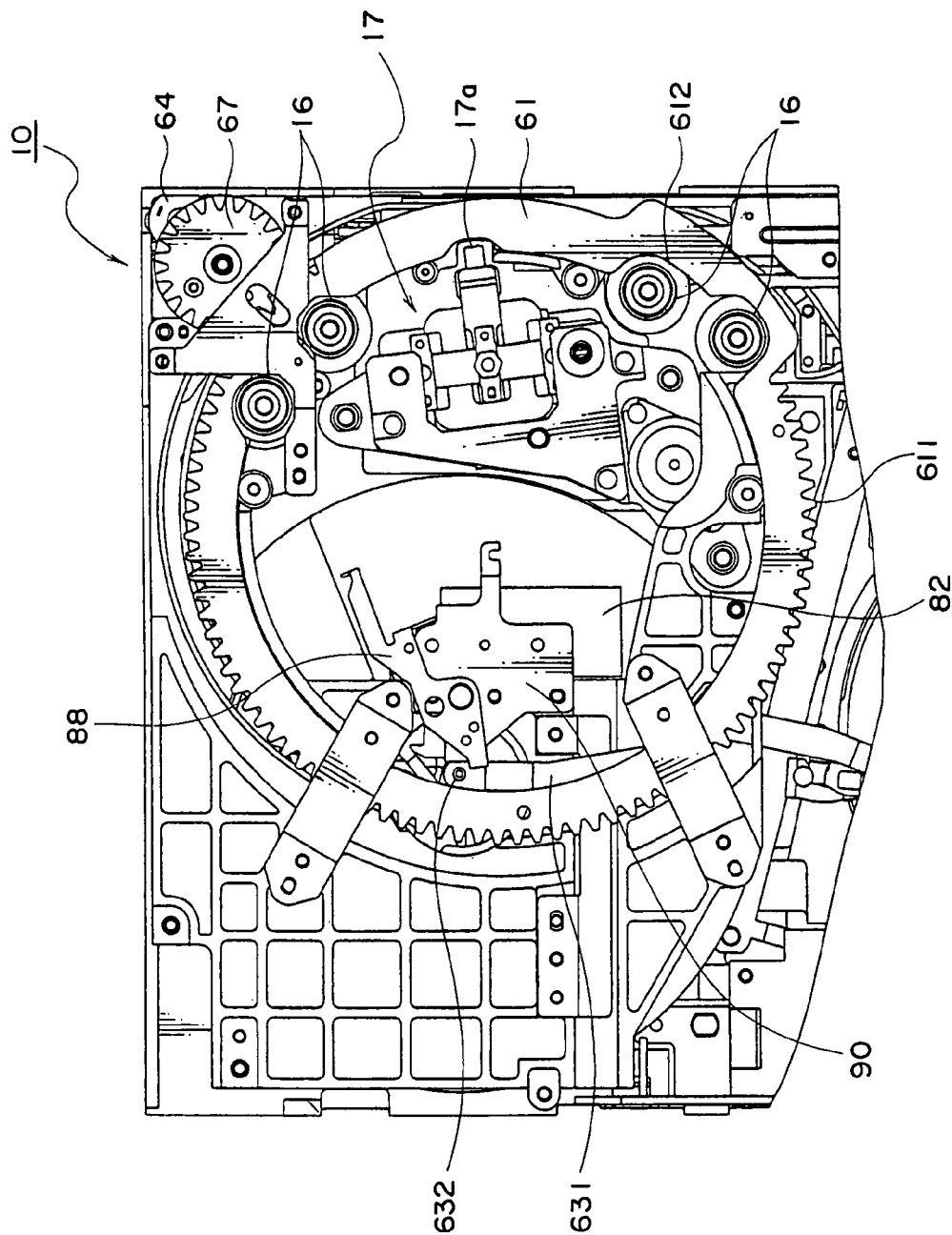
FIG. 25 is a plan view showing an arrangement relationship between the ring the four guide rollers in a case where the grabber is loaded.

Referring to FIGS. 24 and 25, description will be made as regards arrangement relationships between the ring 61 and the four guide rollers 16 in a case where the grabber 15 is put into a state of an initial position (the standby state) and in a case where the grabber 16 is loaded.

FIG. 24 is a plan view showing the arrangement relationship between the ring 61 and the four guide rollers 16 in the case where the grabber 15 is put into the state of the initial position (the standby state). Inasmuch as the upper surfaces of the four guide rollers 16 remain hidden by the ring 61 in this state, it is impossible to adjust the height of the guide rollers 16.

FIG. 25 is a plan view showing the arrangement relationship between the ring 61 and the four guide rollers 16 in the case where the grabber 15 is loaded. In this state, it is understood that the oddly shaped portions 612 of the ring 61 are located at the positions corresponding to the upper surfaces of the four guide rollers 16. Therefore, if necessary, it is possible to adjust the height of the guide rollers 16 by inserting the adjustment tool through each of the oddly shaped portions 612.

Figure 26:
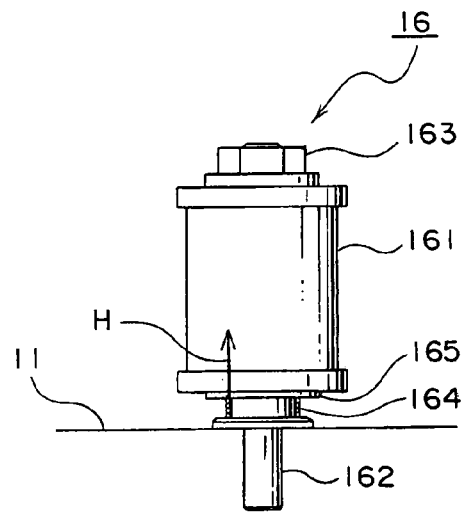
FIG. 26 is a front view of the guide roller used in the tape drive (the recording and/or reproducing device) illustrated in FIG. 1.
Figure 27:
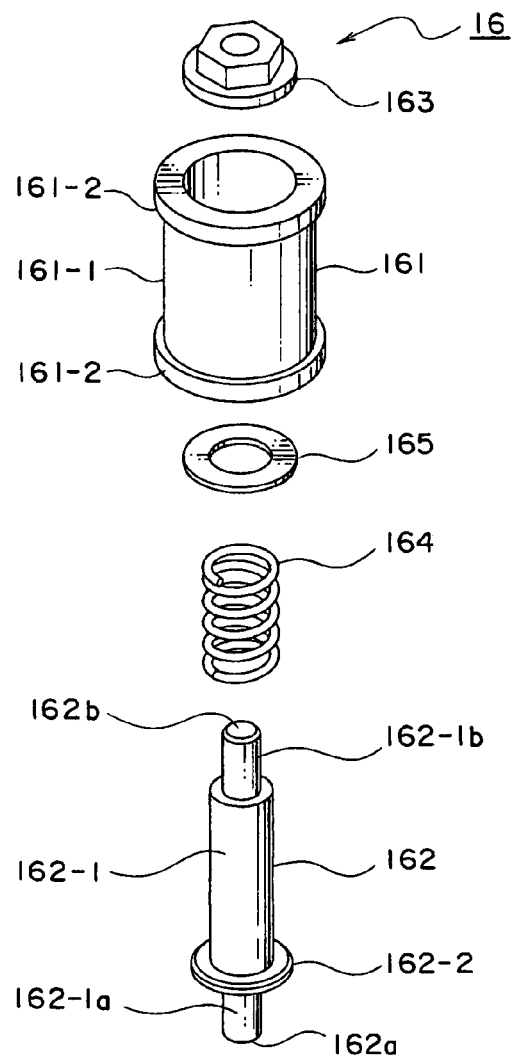
FIG. 27 is an exploded perspective view of the guide roller illustrated in FIG. 26.

Referring to FIGS. 26 and 27, the description will proceed to the guide roller 16 which is capable of adjusting the height thereof. FIG. 26 is a front view of the guide roller 16. FIG. 27 is an exploded perspective view of the guide roller 16.

The guide roller 16 comprises a cylindrical roller 161 which will later be described and a roller shaft 162 for rotatably supporting on the chassis 11 the cylindrical roller 161. The roller shaft 162 comprises a shaft portion 162-1 of a substantially cylindrical shape and a flange portion 162-2 of a substantially disc shape. The shaft portion 162-1 extends in a longitudinal direction (an axial direction) from an lower end 162a of the roller shaft 162 to an upper end 162b of the roller shaft 162. The flange portion 162-2 extends in a radial direction perpendicular to the axial direction at a position apart from the lower end 162a with respect to the shaft portion 162-1 by a predetermined distance.

The shaft portion 162-1 has a thick central portion and comprises a lower end portion 162-1a of the lower end 162a side and a upper end portion 162-1b of the upper end 162b side both of which are thinner than the central portion. That is, by press-inserting the lower end portion 162-1a in a hole (now shown) bored in the chassis 11, it is possible to mount the roller shaft 162 on the chassis 11, as shown in FIG. 26.

The upper end portion 162-1*b* has a male thread (not shown). The male thread of the upper end portion 162-1*b* is for threading a nut for height adjustment of the guide roller 16 thereto.

On the flange portion 162-2, a compression spring 164 is mounted. On the compression spring 164, a ring-shaped washer 164 is mounted. In other words, the compression spring 164 is sandwiched the flange portion 162-2 of the roller shaft 162 and the washer 164 with an outer circumference of the central portion of the shaft portion 162-1 in the roller shaft 162 inserted therein. The washer 165 is inserted between the compression spring 164 and a bottom portion of the roller 161.

Therefore, the compression spring 164 always applies to the washer 165 and the roller 161 with upward force using, as a guide, the central portion of the shaft portion 162-1 in the roller shaft 162 as shown in an arrow H of FIG. 26. That is, the compression spring 164 serves as an urging arrangement for urging the roller 161 upwards.

The roller 161 comprises a cylindrical roller portion 161-1 and a pair of flange portions 162-2 which are disposed in the roller portion 161-1 at upper and lower end portions thereof. The roller portion 161-1 has an outer circumferential surface for guiding traveling of the magnetic tape. The pair of flange portions 162-2 is for controlling positions of end portions of the magnetic tape on traveling the magnetic tape. In addition, a pair of bearings (not shown) is mounted inside of the roller portion 161-1. That is, the roller 161 is rotatably supported on the shaft portion 162-1 of the roller shaft 162 via the pair of the bearings.

According to the guide roller 16 having such a structure, it is possible to adjust the height of the guide roller 16 by fastening the nut 163 disposed in the upper portion of the roller 161.

After the height of the guide roller 16 is adjusted, the nut 163 and the roller shaft 162 are fixed by screw locking. Alternatively, the nut 163 and the roller shaft 162 may be fixed by using a female thread portion of the nut that is added with an anti-loosening agent.

While this invention has thus far been described in conjunction with a preferred embodiment thereof, it is to be understood that modifications will be apparent to those skilled in the art without departing from the spirit of the invention. For example, although the grabber (the pull-out assembly) is received in the interior of the reel hub of the take-up reel and the opening of the reel hub is closed by the shutter disposed in the take-up reel in the above-mentioned embodiment, this invention may be applicable to a recording and/or reproducing device comprising a take-up reel having no shutter. In this event, one side surface of the grabber forms a part of the magnetic tape winding surface of the take-up reel in the above-mentioned predetermined position. That is, the side surface of the grabber and the outer circumferential surface of the take-up reel form the perfect circular (correct) cylindrical magnetic tape winding surface. In other words, it is possible to put the magnetic tape winding surface into the state where there is substantially no uneven. It is therefore possible to taking up the magnetic tape at the constant speed.

In addition, the driving mechanism for moving the pull-out assembly up to the interior of the reel hub of the take-up reel is not restricted to one of the above-mentioned embodiment and may use ones of various types. Although as the pressing arrangement for pressing the head end of the pull-out assembly into the stopper, the shutter comprising the torsion spring is used, the pressing arrangement may surely not be restricted to this. Furthermore, the reception detector for detecting whether or not the pull-out assembly is received in the receiving portion is also not restricted to one of the above-mentioned embodiment and may surely use ones of various types.

Furthermore, although the crimping arrangement crimps to the catcher 92 the grabber shaft 632 for coupling the pull-out element 15 and the ring arm 631 in the above-mentioned embodiment, a crimped part may not required to restrict to the grabber shaft 632. For example, the ring arm 631 may be provided with a pin and the pin may be crimped. Alternatively, a part of the shape of the ring arm 631 may be modified and the modified ring arm may be directly crimped.

What is claimed is:

1. A recording and/or reproducing device, into which a cartridge can be loaded, comprising a take-up reel for taking up a magnetic tape accommodated in said cartridge, said cartridge accommodating said magnetic tape and a coupling element connected to an end portion of said magnetic tape, said recording and/or reproducing device having a pull-out element coupled to said coupling element to form a pull-out assembly when said cartridge is loaded in said recording and/or reproducing device, said recording and/or reproducing device comprising a driving mechanism for driving said pull-out assembly so as to move said pull-out assembly up into an interior of a reel hub of said take-up reel, wherein said reel hub has an opening for passing said pull-out assembly through the interior thereof, said take-up reel having a receiving portion for receiving said pull-out assembly in the interior of said reel hub, wherein said driving mechanism has a shaft inserted in a through hole bored in said pull-out element with a clearance therebetween, wherein said recording and/or reproducing device comprises:

a fixing arrangement for fixing said pull-out assembly in said receiving portion at a predetermined position on receiving said pull-out assembly in said receiving portion;

a positioning member for positioning said shaft with a center of said shaft substantially coincided with a central axis of said take-up reel and with said clearance held between said shaft and an inner wall of said through hole when said pull-out assembly is received in said receiving portion.

2. The recording and/or reproducing device as claimed in claim 1, wherein said positioning member comprises a positioning arm which extends to a center portion of said take-up reel in a radial direction, said positioning arm having a catcher for catching said shaft at a tip thereof.

3. The recording and/or reproducing device as claimed in claim 2, wherein said catcher has a uniquely positioning member for uniquely determining a position of said shaft.

4. The recoding and/or reproducing device as claimed in claim 3, wherein said uniquely positioning member consists of a V-shaped groove.

5. The recording and/or reproducing device as claimed in claim 4, wherein said V-shaped groove has an angle between 60 degrees and 90 degrees, both inclusive.

6. The recording and/or reproducing device as claimed in claim 2, wherein further comprises a crimping arrangement for crimping said shaft to said catcher.

7. The recording and/or reproducing device as claimed in claim 6, wherein said driving mechanism comprises a ring having a gear portion at an outer circumferential edge thereof; a ring arm having a first end coupled to said ring and a second end coupled to said shaft; and a motor coupled to said gear portion of said ring through a plurality of reduction gears, wherein said crimping arrangement comprises a particular reduction gear in said plurality of reduction gears that is engaged with said gear portion of said ring, said particular reduction gear comprising a clutch member.

8. The recording and/or reproducing device as claimed in claim 7, wherein said clutch member comprises:

a rotation axis;

a lower clutch gear, rotatably disposed around said rotation axis, for being engaged with one of said reduction gears;

an upper clutch gear, rotatably disposed around said rotation axis, for being engaged with said gear portion of said ring; and a spring, disposed between said lower clutch gear and said upper clutch gear, for absorbing rotation of said lower clutch gear and said upper clutch gear.

9. The recording and/or reproducing device as claimed in claim 2, wherein further comprises a reception detector for detecting, in cooperation with said positioning member, whether or not said pull-out assembly is received in said receiving portion.

10. The recording and/or reproducing device as claimed in claim 9, wherein said reception detector comprises:

a sensor board fixedly mounted on said positioning member;

a sensor mounted on said sensor board; and a sensor arm, rotatably mounted to said positioning member, for turning said sensor on or off.

11. The recording and/or reproducing device as claimed in claim 10, wherein said sensor comprises a photo-interrupter.

12. The recording and/or reproducing device as claimed in claim 11, wherein said sensor arm comprises:

a rotation axis mounted on said positioning member;

an engaging arm extending from said rotation axis up to on said catcher to engage with said shaft; and a shielding arm extending from said rotation axis to control shielding/opening of said photo-interrupter.

13. The recording and/or reproducing device as claimed in claim 12, wherein said reception detector further comprises an urging arrangement for urging said sensor arm in a direction where said shielding arm shields said photo-interrupter.

14. The recording and/or reproducing device as claimed in claim 13, wherein said positioning member comprises an extending portion extending in the opposite direction to said positioning arm, said sensor arm comprising an urging arm extending in the opposite direction to said engaging arm, said urging arrangement comprising a tensile spring constructed between said urging arm and said extending portion.

15. The recording and/or reproducing device as claimed in claim 1, wherein said take-up reel has a stopper for stopping a head end of said pull-out assembly, said fixing arrangement comprising a pressing arrangement for pressing the head end of said pull-out assembly to said stopper.

16. The recording and/or reproducing device as claimed in claim 15, wherein said pressing arrangement comprises a shutter mounted on said take-up reel, said shutter including an open/close door for opening/closing the opening of said reel hub, said shutter including an urging arrangement which makes said open/close door contact with a rear end of said pull-out assembly on closing said open/close door to urge the head end of said pull-out assembly toward said stopper.

17. The recording and/or reproducing device as claimed in claim 16, wherein said urging arrangement comprises a torsion spring.

* * * * *